US008240778B2

(12) United States Patent  
Domsalla et al.

(10) Patent No.: US 8,240,778 B2  
(45) Date of Patent: Aug. 14, 2012

(54) HYDRAULIC TRAILER BRAKE SYSTEM

(75) Inventors: Eberhard Domsalla, Burgschwalbach (DE); Heiko Gastauer, Losheim (DE); Uwe Greiff, Bad Homburg (DE); Ralf Hartmann, Kriftel (DE); Andreas Heise, Erzhausen (DE); Axel Hinz, Neu Anspach (DE); Jan Hoffmann, Roβbach (DE); Hans-Peter Wolf, Niedernhausen (DE)

(73) Assignee: Continental Teves AG & Co. oHG (DE)

( * ) Notice: Subject to any disclaimer, the term of this patent is extended or adjusted under 35 U.S.C. 154(b) by 684 days.

(21) Appl. No.: 12/301,665

(22) PCT Filed: May 22, 2007

(86) PCT No.: PCT/EP2007/054970
§ 371 (c)(1),
(2), (4) Date: Jul. 30, 2009

(87) PCT Pub. No.: WO2007/135160
PCT Pub. Date: Nov. 29, 2007

(65) Prior Publication Data
US 2009/0295221 A1 Dec. 3, 2009

(30) Foreign Application Priority Data

| May 22, 2006 | (DE) | 10 2006 024 160 |
| Jul. 3, 2006 | (DE) | 10 2006 030 924 |
| Jul. 18, 2006 | (DE) | 10 2006 033 590 |
| May 22, 2007 | (DE) | 10 2007 024 108 |

(51) Int. Cl.
*B60T 8/18* (2006.01)

(52) U.S. Cl. ........................ 303/22.2; 303/123

(58) Field of Classification Search .............. 188/112 A, 188/3 R, 20, 123, 7, 3, 10, 11, 22.1, 22.2, 188/15–17
See application file for complete search history.

(56) References Cited

U.S. PATENT DOCUMENTS

| 3,758,165 A | * | 9/1973 | Savelli | 303/20 |
| 4,861,118 A | * | 8/1989 | Burckhardt et al. | 303/113.2 |
| 5,054,861 A | * | 10/1991 | Resch | 303/113.2 |
| 5,342,120 A | * | 8/1994 | Zimmer et al. | 303/113.2 |
| 5,496,098 A | * | 3/1996 | Brearley | 303/22.2 |
| 5,918,949 A | * | 7/1999 | Volz et al. | 303/115.4 |
| 6,273,525 B1 | * | 8/2001 | Erban et al. | 303/11 |
| 6,446,490 B1 | * | 9/2002 | Lohner et al. | 73/39 |
| 2006/0033308 A1 | | 2/2006 | Waldbauer et al. | |

FOREIGN PATENT DOCUMENTS

| DE | 201 16 706 U1 | 12/2001 |
| DE | 203 16 698 U1 | 3/2005 |
| EP | 1 308 358 A1 | 5/2003 |
| EP | 1 375 279 A1 | 1/2004 |
| WO | WO 97/13669 | 4/1997 |
| WO | WO 2004/041614 A1 | 5/2004 |

* cited by examiner

Primary Examiner — Melanie Torres Williams
(74) Attorney, Agent, or Firm — RatnerPrestia

(57) ABSTRACT

A trailer device for driving stabilization of vehicle combinations is provided. In order to design a device for driving stabilization of passenger vehicle trailers in a cost-effective and simple manner, a brake system for braking the trailer by an overrun brake and for stability regulation is designed so as to have separating valves, switching valves, inlet and outlet valves and a pressure build-up pump. A stabilizing coupling is also connected by means of a second pressure medium pump to actuators which can vary the clamping force of the stabilizing coupling between the trailer and tractor vehicle if the second pressure medium pump conveys pressure medium from the storage tank into or out of the actuators.

29 Claims, 14 Drawing Sheets

HYDRAULIC TRAILER BRAKE SYSTEM

CROSS REFERENCE TO RELATED APPLICATIONS

This application is the U.S. national phase application of PCT International Application No. PCT/EP2007/054970, filed May 22, 2007, which claims priority to German Patent Application No. DE102006024160.6, filed May 22, 2006 and German Patent Application No. DE102006030924.3, filed Jul. 3, 2006, the contents of such applications being incorporated by reference herein.

BACKGROUND OF THE INVENTION

1. Field of the Invention

The invention relates to a hydraulic trailer brake system.

2. Description of the Related Art

EP 1 375 279 discloses a generic trailer brake system for braking the wheels of an inertia-braked trailer in order to reduce rolling movements. The brake system has an electro-hydraulic stabilizing device EHS which is combined with an antilock system and which can brake both sides of the trailer individually in the event of rolling movements. For this purpose, special additional pressure-oil reservoirs, special ABS piston/cylinder components and special EHS cylinder/piston components are provided, by means of which the ABS function and the EHS function can be carried out.

A device for stabilizing a road vehicle, in particular a passenger car, having a trailer drawn by the road vehicle is known from DE 19964048 A1, the road vehicle being monitored with regard to rolling movements, and, when a rolling movement is detected, an essentially periodic yawing moment is imparted automatically to the road vehicle and is essentially in phase opposition to the rolling movement.

A method for stabilizing a vehicle is known from DE 100 48 418 A1, a periodically varying yawing moment being applied to the vehicle by means of alternating brake action.

SUMMARY OF THE INVENTION

The object on which the invention is based is to provide a simple and cost-effective trailer brake system of the type initially mentioned, by means of which rolling movements of trailers can be prevented or reduced in a simple way, while high braking stability is maintained.

This object is achieved by means of a hydraulic trailer brake system including a device for braking the wheels of the trailer and with a controllable pressure generator for the wheel-individual or axle-individual activation of the wheel brakes, the device being assigned a hydraulic brake force transmission device, with a reservoir for the pressure medium, and a brake master cylinder, and the brake force transmission device being connected to the wheel brakes via brake lines, and also with an electronic control or regulation unit which receives energy via a supply unit, is distinguished in that at least two wheel brakes are connected to the brake master cylinder via a first isolating valve arranged in the brake lines and via a first changeover valve, in that the wheel brakes are assigned at least one first inlet valve and one first outlet valve, in that there is provided in a bypass line, downstream of the first changeover valve and of the first isolating valve, a first electrically activatable pressure medium pump, the suction side of which is connected to the first changeover valve, to at least one first outlet valve and to a first low-pressure accumulator and the delivery side of which is connected to the first isolating valve and to at least one first inlet valve, and in that a stabilizing coupling is connected via a second pressure medium pump to actuators which can vary the tension force of the stabilizing coupling between the trailer and traction vehicle, when the pressure medium pump conveys pressure medium out of the reservoir into or out of the actuators.

The hydraulic trailer brake system for the driving stabilization of vehicle trailers is advantageously based on a modified ESP system used in vehicles and having preferably two brake circuits. To stabilize an at least single-axle passenger car trailer, according to advantageous exemplary embodiments (FIGS. 1 to 8) the wheel brakes are connected to one brake circuit and the ball-shaped stabilizing coupling is connected to the other pressure circuit. Further components or subassemblies, such as, for example, high-pressure accumulators and/or hydraulic cylinders, may also be connected to the brake or pressure circuits. The wheel brakes may in this case be activated individually or in pairs (the left and the right wheel of an axle).

According to a further advantageous exemplary embodiment (FIG. 9), the wheels of one axle are connected to one brake circuit, the ball-shaped stabilizing coupling and the wheels of a further axle being connected to the other brake circuit.

It has proved to be particularly advantageous if the exemplary embodiment according to FIG. 9, or design variants of this, is modified such that the delivery sides of the pressure medium pumps arranged in both circuits are connected to one another via a connecting line, as illustrated in FIGS. 11 to 14. The two pumps can thereby generate the brake pressure in the wheel brakes of one axle. By means of the short-circuited pumps, the wheels of one axle can be braked in a directed manner according to predetermined criteria, while the wheels of the other axle can be braked at a later time point according to the same or other stipulations. In this case, the low-pressure accumulators of the two circuits are likewise also connected to one another via a connecting line.

By means of a modified switching circuit of an ESP system, an active pressure build-up in the wheel brakes of the trailer can advantageously take place.

Further technical benefits are the possible axle-related or side-related activation of two wheels in each case (2-channel). As a result, a higher control performance due to the directed introduction of a yawing moment in order to reduce the rolling movements can be achieved.

The stabilizing coupling may likewise be activated via 2 channels.

A further technical benefit, as compared with existing systems, is that leaks in the ball-shaped stabilizing coupling circuit are detected, and this circuit has a follow-up connection.

It is advantageous that the master cylinder is connected to a brake line which is connected downstream of the first isolating valve via a brake pressure subline having a first inlet valve to the first wheel brake and via a brake pressure subline having the first inlet valve to the second wheel brake of a first trailer axle, and that the brake line is connected downstream of the isolating valve via a brake pressure subline having a first inlet valve to the wheel brakes of a second trailer axle (FIG. 1).

To reduce the brake pressure, it is advantageous that the wheel brakes are connected to return lines in each of which a first outlet valve is arranged, the return lines being connected to the first low-pressure accumulator and, via a line, to the suction side of the first pump and to the first changeover valve which is connected to the brake line (FIG. 1).

Two wheels and one pair of wheels can be regulated by means of this pressure force or brake force transmission circuit.

In normal braking, pressure is generated in all 4 wheels by the brake master cylinder.

In drives in reverse, the inlet valves are closed and the volume in the wheel saddles is conducted to the low-pressure accumulator by means of outlet valves.

In hazardous situations, the isolating valve is closed and the electrical changeover valve is open. The pump then conveys pressure medium out of the low-pressure accumulator or through the electrical changeover valve out of the master cylinder via the inlet valve or inlet valves to the corresponding wheels. In order to achieve a rapid response of the trailer, the inlet valve for the pair of wheels is opened with a time delay (only when the desired pressure prevails in the two regulated wheels). The reduction in the brake pressure takes place by means of a pressure or volume reduction (in the wheel saddles) via the outlet valve or outlet valves, from which the pressure medium flows to the low-pressure accumulator and (if necessary) is conveyed into the master cylinder again by means of the pump.

ABS: When a wheel locks, the corresponding inlet valve is closed and the corresponding outlet valve is opened. The pressure medium flows via the outlet valve from the corresponding wheel or pair of wheels to the low-pressure accumulator, from which the pressure medium is conveyed back to the master cylinder by means of the pump via the isolating valve.

Furthermore, the hydraulic trailer brake system is expediently designed such that the reservoir is connected to a second pressure line which is connected downstream of the second isolating valve via a pressure subline having a second inlet valve to actuators of a ball-shaped stabilizing coupling, and the actuators are connected to a return line in which a second outlet valve is arranged, the return line being connected to the second low-pressure accumulator and, via a line, to the suction side of the second pump and to the second changeover valve which is connected to the line.

In a hazardous situation, the pressure medium supply, normally regulated as a function of the speed, into the actuators of the stabilizing coupling may additionally be used for stabilizing the connection between the traction vehicle and trailer. For this purpose, the isolating valve is closed and the electrical changeover valve, via which the pump conveys the pressure medium to two pistons of the actuators at the ball-shaped coupling, is opened. The friction acting on the coupling can thereby be set, as desired. If the moment of friction is to be lowered, the inlet valve is closed and the outlet valve is opened. The fluid flows via the outlet valve from the piston to the low-pressure accumulator, from which the fluid is conveyed back to the master cylinder by means of the pump via the isolating valve.

The supply of energy to the pump drive motors assigned to the pumps takes place via a separate supply unit. For this purpose, there is provision for the supply unit to contain accumulators, preferably an accumulator pack, which are connected to the battery of the vehicle via a connecting element between the vehicle and trailer, the accumulators being connected to the control and regulation unit.

In an embodiment according to aspects of the invention, the master cylinder is connected to a brake line which is connected downstream of the first isolating valve via a brake pressure subline having a first inlet valve to the first wheel brake and via a brake pressure subline having the first inlet valve to the second wheel brake of a first trailer axle, and the brake line is connected upstream of the isolating valve via a brake pressure subline having a first inlet valve to the wheel brakes of a second trailer axle (FIG. 2).

By means of this pressure force or brake force transmission circuit, an individual regulation of the pressure build-up for two wheels on one axle and for a pair of wheels on another axle can be implemented.

Pressure reduction regulation is likewise provided for two wheels and a pair of wheels.

In normal braking, pressure is generated in all four wheels by the brake master cylinder.

In drives in reverse, the inlet valves are closed and the volume in the wheel saddles is conducted to the low-pressure accumulator by means of outlet valves.

In hazardous situations, the isolating valve is closed and the electrical changeover valve is open. The pump then conveys pressure medium out of the low-pressure accumulator or through the electrical changeover valve out of the master cylinder via the inlet valve or inlet valves to the corresponding wheels. The reduction in the brake pressure takes place by means of a pressure or volume reduction (in the wheel saddles) via the outlet valve or outlet valves, from which the fluid flows to the low-pressure accumulator and, if necessary, is conveyed into the master cylinder again by means of the pump.

ABS: When a wheel locks, the corresponding inlet valve is closed and the corresponding outlet valve is opened. The fluid flows via the outlet valve from the corresponding wheel or pair of wheels to the low-pressure accumulator, from which the brake fluid is conveyed back to the master cylinder by means of the pump via the isolating valve.

In a hazardous situation, in this embodiment, too, the connection between the traction vehicle and trailer is stabilized. For this purpose, the isolating valve is closed and the electrical changeover valve, via which the pump conveys the brake fluid to two pistons at the ball-shaped coupling, is opened. The friction acting on the coupling can thereby be set, as desired. If the moment of friction is to be lowered, the inlet valve is closed and the outlet valve is opened. The brake fluid flows via the outlet valve from the piston to the low-pressure accumulator, from which the brake fluid is conveyed back to the master cylinder by means of the pump via the isolating valve.

A further hydraulic trailer brake system for regulating two pairs of wheels is advantageously designed such that the master cylinder is connected to a brake line which is connected downstream of the first isolating valve via a brake pressure subline having a first inlet valve to first wheel brakes of a first trailer axle and via a brake pressure subline having the first inlet valve to the second wheel brakes of a second trailer axle. It is advantageous that the wheel brakes are connected to return lines, in each of which a first outlet valve is arranged, the return lines being connected to the first low-pressure accumulator and, via a line, to the suction side of the first pump and to the first changeover valve which is connected to the brake line (12). (FIG. 3).

By means of this pressure force or brake force transmission circuit, a regulation of the pressure build-up for two pairs of wheels can be implemented. In normal braking, pressure is generated in all four wheels by the brake master cylinder.

In drives in reverse, the inlet valves are closed and the volume in the wheel saddles is conducted to a low-pressure accumulator by means of outlet valves. In hazardous situations, to increase the stability, the isolating valve is closed and the electrical changeover valve is opened. The pump then conveys pressure medium out of the low-pressure accumulator or through the electrical changeover valve out of the master cylinder via the inlet valve or inlet valves to the corresponding pairs of wheels. The reduction in the brake pressure takes place by means of a pressure or volume reduction (in the wheel saddles) via the outlet valve or outlet valves, from which the pressure medium flows to the low-pressure accumulator and, if necessary, is conveyed into the master cylinder again by means of the pump.

ABS: If a wheel locks, the corresponding inlet valve is closed and the corresponding outlet valve is opened. The pressure medium flows via the outlet valve from the corresponding pair of wheels to the low-pressure accumulator, from which the brake fluid is conveyed back to the master cylinder by means of the pump via the isolating valve.

In this embodiment, too, the connection between the traction vehicle and trailer is stabilized. For this purpose, the isolating valve is closed and the electrical changeover valve, via which the pump conveys the pressure medium to two pistons at the ball-shaped stabilizing coupling, is opened. As a result, the friction acting on the coupling can be set, as desired. If the moment of friction is to be lowered, the inlet valve is closed and the outlet valve is opened. The pressure medium flows via the outlet valve from the piston to the low-pressure accumulator, from which the brake fluid is conveyed back to the master cylinder by means of the pump via the isolating valve.

According to a fourth embodiment, there is provision for the brake line to be connected downstream of the first isolating valve to a high-pressure accumulator. In this case, it is expedient that preferably an inlet valve serving as a filter is arranged between the isolating valve and the outlet valve in the brake pressure subline (FIG. 4).

By means of this pressure force or brake force transmission circuit, a regulation of the pressure build-up for two pairs of wheels can be implemented. As soon as the pressure in the high-pressure accumulator falls, the pump conveys pressure medium out of the low-pressure accumulator or through the electrical changeover valve out of the master cylinder via the inlet valve and the switched outlet valve to the high-pressure accumulator. The inlet valve serves merely for filtering the pressure medium. By a second filter being integrated into the outlet valve or by a filter being integrated into the corresponding line, the inlet valve could be saved (FIG. 4).

In normal braking, pressure is generated in all four wheels by the brake master cylinder.

In drives in reverse, the inlet valves are closed and the volume in the wheel saddles is conducted to the low-pressure accumulator by means of outlet valves.

In hazardous situations, the isolating valve is closed and the electrical changeover valve is opened. The pump then conveys brake fluid out of the low-pressure accumulator or through the electrical changeover valve out of the master cylinder via the inlet valve or inlet valves to the corresponding pairs of wheels. To shorten the response time of the trailer, moreover, the outlet valve of the high-pressure accumulator opens so that the latter can assist the pump in supplying the wheels. The reduction in the brake pressure takes place by means of a pressure or volume reduction (in the wheel saddles) via the outlet valve or outlet valves, from which the brake fluid flows to the low-pressure accumulator and (if necessary) is conveyed into the master cylinder or into the high-pressure accumulator again by means of the pump.

ABS: If a wheel locks, the corresponding inlet valve is closed and the corresponding outlet valve is opened. The pressure medium flows via the outlet valve from the corresponding pair of wheels to the low-pressure accumulator, from which the brake fluid is conveyed back to the master cylinder by means of the pump via the isolating valve.

Furthermore, advantageously, a hydraulic trailer brake system is designed, with regard to the circuit II for the ball-shaped stabilizing coupling, such that the reservoir is connected to a second pressure line in which a second isolating valve is connected via a pressure subline and a pressure line having second inlet valves to the actuators of the ball-shaped stabilizing coupling, and the actuators are connected to return lines in which the second outlet valve is arranged, the return lines being connected to the second low-pressure accumulator and, via a line, to the suction side of the second pump and to the second changeover valve which is connected to the line. In this case, each of the pressure sublines connected in each case to an actuator of the ball-shaped stabilizing coupling is assigned in each case an inlet and an outlet valve and a separate pressure sensor. The circuit I and the circuit II are set up identically. The pressure force or brake force transmission circuit I in this case corresponds in its design to the pressure force or brake force transmission circuit in FIG. 3, and therefore there is no need for a more detailed description (FIG. 5).

Furthermore, a hydraulic trailer brake system is designed such that the reservoir is connected to a second pressure line in which a second isolating valve is connected via a pressure subline having a second inlet valve to the actuators of the ball-shaped stabilizing coupling and a pressure line having a second inlet valve is connected to a high-pressure accumulator, and the actuators are connected to a return line and the high-pressure accumulator is connected to a return line, in which return lines second outlet valves are arranged, the return lines being connected to the second low-pressure accumulator and, via a line, to the suction side of the second pump and to the second changeover valve which is connected to the line. In this case, the pressure subline connected to the two actuators of the ball-shaped stabilizing coupling and the pressure subline connected to a high-pressure accumulator are assigned in each case an inlet and an outlet valve and a separate pressure sensor. The circuit I and the circuit II are set up identically. The pressure force or brake force transmission circuit I in this case corresponds in its design to the pressure force or brake force transmission circuit in FIG. 3, and therefore there is no need for a more detailed description (FIG. 6).

Furthermore, in contrast to the version according to FIG. 1, it is expedient, in the pressure transmission circuit for activating the ball-shaped stabilizing coupling, that the reservoir is connected to a second pressure line in which a second isolating valve is connected via a pressure subline to the actuators of the ball-shaped stabilizing coupling, the pressure line being connected via a line to the suction side of the second pump. The pressure force or brake force transmission circuit I in this case corresponds in its design to the pressure force or brake force transmission circuit in FIG. 1, and therefore there is no need for a more detailed description (FIG. 7).

Moreover, in contrast to the version according to FIG. 7, it is expedient, in the pressure transmission circuit for activating the ball-shaped stabilizing coupling, that an outlet valve is arranged upstream of the actuators of the ball-shaped stabilizing coupling in the pressure subline (FIG. 8).

A hydraulic trailer brake system according to aspects of the invention in which a tandem brake master cylinder is provided is also advantageous. By means of the tandem master cylinder, the two circuits function independently of one another. One circuit supplies the ball-shaped stabilizing coupling and one pair of wheel brakes and the other circuit supplies the other pair of wheel brakes with fluid. The trailer brake system in this case therefore provides for one pair of wheel brakes to be arranged in the circuit of the ball-shaped stabilizing coupling and for another pair of wheel brakes to be arranged in a brake circuit. Of course, only one wheel brake per circuit may also be provided if the trailer has only one axle. The embodiment is characterized in that the brake master cylinder has two pressure chambers with two outlets, the brake line being connected to the one outlet and the pressure line to the other outlet, and the brake line being connected downstream of the first isolating valve via a brake pressure subline having a first inlet valve to the wheel brakes of a first trailer axle, and the wheel brakes being connected to a return line in which a first outlet valve is arranged, the return line being connected to the first low-pressure accumulator and, via a line, to the suction side of the first pump and to the first changeover valve which is connected to the brake line. In this case, the pressure line is connected via a second isolating valve in a pressure subline having a second currentlessly closed inlet valve to the actuators of the ball-shaped stabilizing coupling and via a further pressure subline and a second inlet valve to the wheel brakes of a second trailer axle, the actuators and the wheel brakes being connected in each case to a return line in each of which a second outlet valve is arranged. The return lines are connected in each case to the second low-pressure accumulator and, via a line, to the suction side of the second pump and to the second changeover valve which is connected to the line. In contrast to the embodiment according to FIG. 1, the inlet valve of the ball-shaped stabilizing coupling circuit is designed as a currentlessly closed valve without a nonreturn valve. By means of the currentlessly closed inlet valve in the ball-shaped stabilizing coupling circuit, during normal braking via the actuation of the master cylinder, for example by means of the inertia brake, a pressure drop in the ball-shaped stabilizing coupling is prevented. (FIG. 9).

According to a further embodiment of the hydraulic trailer brake system, it is expedient that the brake master cylinder is connected to a second pressure line in which a second isolating valve is connected in a pressure subline having a second currentlessly closed inlet valve to the actuators of the ball-shaped stabilizing coupling and via a pressure subline and a second currentlessly open inlet valve to the wheel brakes of a second trailer axle, the actuators and the wheel brakes being connected in each case to a return line in each of which a second outlet valve is arranged, the return lines being connected to the second low-pressure accumulator and, via lines, to the suction side of the second pump and to the second changeover valve which is connected to the second pressure line. Consequently, in contrast to the design variant according to FIG. 9, the trailer brake system provides only one brake master cylinder having a pressure chamber, the second pressure line then being connected to the brake line. It is in this case advantageous that two wheel brakes are connected to the brake master cylinder via a first isolating valve arranged in the brake line and via a first changeover valve, that, furthermore, the wheel brakes of the first axle are assigned a first inlet and a first outlet valve, that, moreover, there is provided in a bypass line, downstream of the first changeover valve and of the first isolating valve, the first electrically activatable pressure medium pump, the suction side of which is connected to the first changeover valve, to the first outlet valve and to the first low-pressure accumulator and the delivery side of which is connected to the first isolating valve and to the first inlet valve. In the hydraulic trailer brake system in the exemplary embodiment according to FIG. 10, the wheel brakes of the first axle are connected to the first low-pressure accumulator via the return line having the outlet valve. In contrast to the embodiment according to FIG. 1, in this embodiment, too, the inlet valve of the ball-shaped stabilizing coupling circuit is designed as a currentlessly closed valve without a nonreturn valve. By means of the currentlessly closed inlet valve in the ball-shaped stabilizing coupling circuit, during normal braking via the actuation of the master cylinder, for example by means of the inertia brake, a pressure drop in the ball-shaped stabilizing coupling is prevented. The trailer brake system therefore in this case provides for one pair of wheel brakes to be arranged in the circuit of the ball-shaped stabilizing coupling and for another pair of wheel brakes to be arranged in a separate brake circuit. Of course, only one wheel brake per circuit may also be provided if the trailer has only one axle (FIG. 10).

The hydraulic trailer brake system illustrated diagrammatically in FIG. 11 advantageously provides, as compared with the system illustrated, for example, in FIG. 10, for the return lines with the first outlet valve and with the second outlet valve to be connected to the first low-pressure accumulator and to the second low-pressure accumulator via a connecting line. Furthermore, this embodiment also provides for the delivery sides of the first pressure medium pump and of the second pressure medium pump to be connected to one another via a connecting line. In this case, the connecting line is connected to the brake line between the first isolating valve and the bypass line having the first pressure medium pump and to the pressure subline between the second isolating valve and the bypass line having the second pressure medium pump. This embodiment makes it possible that fluid can be conveyed to a pair of wheel brakes of a trailer axle by means of the first and the second pump. By means of this "short-circuited" variant, in which the low-pressure accumulator and the two pumps of the two circuits are connected to one another, a trailer axle can be braked in a directed manner according to specific criteria by means of both pumps and therefore with high power, while the other axle is braked according to other or identical criteria, for example according to criteria which take into account a braking time point. The criteria are stipulated by the electronic control unit on the basis of measured and/or calculated information on the driving behavior of the trailer and/or of the vehicle (FIG. 11).

The hydraulic trailer brake system is expediently designed such that, in contrast to the design variant according to FIG. 11, the second isolating valve is dispensed with. For this purpose, the brake system is designed such that the brake master cylinder is connected to the suction side of the second pressure medium pump by means of a second pressure line via a second changeover valve, and that the delivery side of the pump is connected via the pressure subline having the inlet valve to the actuators of the ball-shaped stabilizing coupling and via a pressure subline and the inlet valve to the wheel brakes of a second trailer axle, the actuators and the wheel brakes being connected in each case to a return line in each of which a second outlet valve is arranged, the return lines being connected via the connecting line to the first and the second low-pressure accumulator and, via a line, to the suction side of the second pump and to the second changeover valve which is connected to the line. Furthermore, for this purpose, there is provision for two wheel brakes to be connected to the brake master cylinder via a first isolating valve arranged in the brake line and via a first changeover valve, for the wheel brakes to be assigned a first inlet and a first outlet valve, for there to be provided in a bypass line, downstream of the first changeover valve and of the first isolating valve, the first electrically activatable pressure medium pump, the suction side of which is connected to the first changeover valve, to the first outlet valve and to the first low-pressure accumulator and the delivery side of which is connected to the first isolating valve and to the first inlet valve, and for the delivery sides of the first pressure medium pump and of the second pressure medium pump to be connected to one another via a connecting line. In this design variant, the ball-shaped stabilizing coupling is acted upon by the hydraulic medium via the two currentlessly closed valves, to be precise the changeover valve and the inlet valve, when the electronic control unit outputs the control signals for opening the changeover valve and the inlet valve as a function of the driving behavior of the trailer and/or of the vehicle (FIG. 12).

A further advantageous design variant according to aspects of the invention is designed in such a way that the second changeover valve is dispensed with, as compared with the design according to FIG. 12. Consequently, the costs of the trailer brake system can be reduced. The second ball-shaped stabilizing coupling circuit with the ball-shaped stabilizing coupling and with the second pair of wheel brakes is supplied with hydraulic medium via the opening or closing of the currentlessly closed changeover valve of the first circuit and the currentlessly closed inlet valve or the currentlessly open inlet valve having the nonreturn valve according to corresponding activation via the electronic control unit. For this purpose, the design variant according to aspects of the invention is characterized in that two first wheel brakes are connected to the brake master cylinder via an isolating valve arranged in the brake line and via a changeover valve, in that the first wheel brakes are assigned a first inlet and a first outlet valve, in that there is provided in a bypass line, downstream of the changeover valve and of the isolating valve, the first electrically activatable pressure medium pump, the suction side of which is connected to the changeover valve, to the first outlet valve and to the first low-pressure accumulator and the delivery side of which is connected to the first isolating valve and to the first inlet valve, and the first changeover valve is connected via a connecting line to the suction side of the second pressure medium pump, to the second low-pressure accumulator and to the second outlet valve, the second low-pressure accumulator being connected to the first low-pressure accumulator via the connecting line, and the delivery side of the second pressure medium pump being connected via the connecting line to the delivery side of the first pressure medium pump and being connected via the pressure subline having the inlet valve to the actuators of the ball-shaped stabilizing coupling and via a pressure subline and the inlet valve to the wheel brakes of a second trailer axle, the wheel brakes being connected to the connecting line via the return line and the outlet valve (FIG. 13).

Furthermore, a further advantageous version is provided, in which the hydraulic trailer brake system is designed in such a way that the master cylinder is connected to a brake line which is connected downstream of the first isolating valve via a brake pressure subline having a first inlet valve to first wheel brakes of a first trailer axis and via a brake pressure subline having the first inlet valve to the second wheel brakes of a second trailer axle. All the wheel brakes are connected to return lines in each of which a first outlet valve is arranged, the return lines being connected to the first low-pressure accumulator and, via a line, to the suction side of the first pump and to the first changeover valve which is connected to the brake line. The brake master cylinder is in this case connected to a second pressure line in which a second isolating valve is connected via a pressure subline having a second inlet valve to the actuators of the ball-shaped stabilizing coupling. The actuators are connected to a return line in which a second outlet valve is arranged, the return line being connected to the second low-pressure accumulator and, via a line, to the suction side of the second pump and to the second changeover valve. The changeover valve is connected to the line. Furthermore, the return lines having the first outlet valves are connected via a connecting line to the first low-pressure accumulator and to the second low-pressure accumulator. Moreover, the delivery sides of the first pressure medium pump and of the second pressure medium pump are connected to one another via a connecting line. A nonreturn valve opening to the stabilizing coupling is advantageously arranged between the inlet valve and the connection point of the return line having the outlet valve to the brake subline (FIG. 14).

An exemplary embodiment of the invention is illustrated in the drawing and is described in more detail below.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
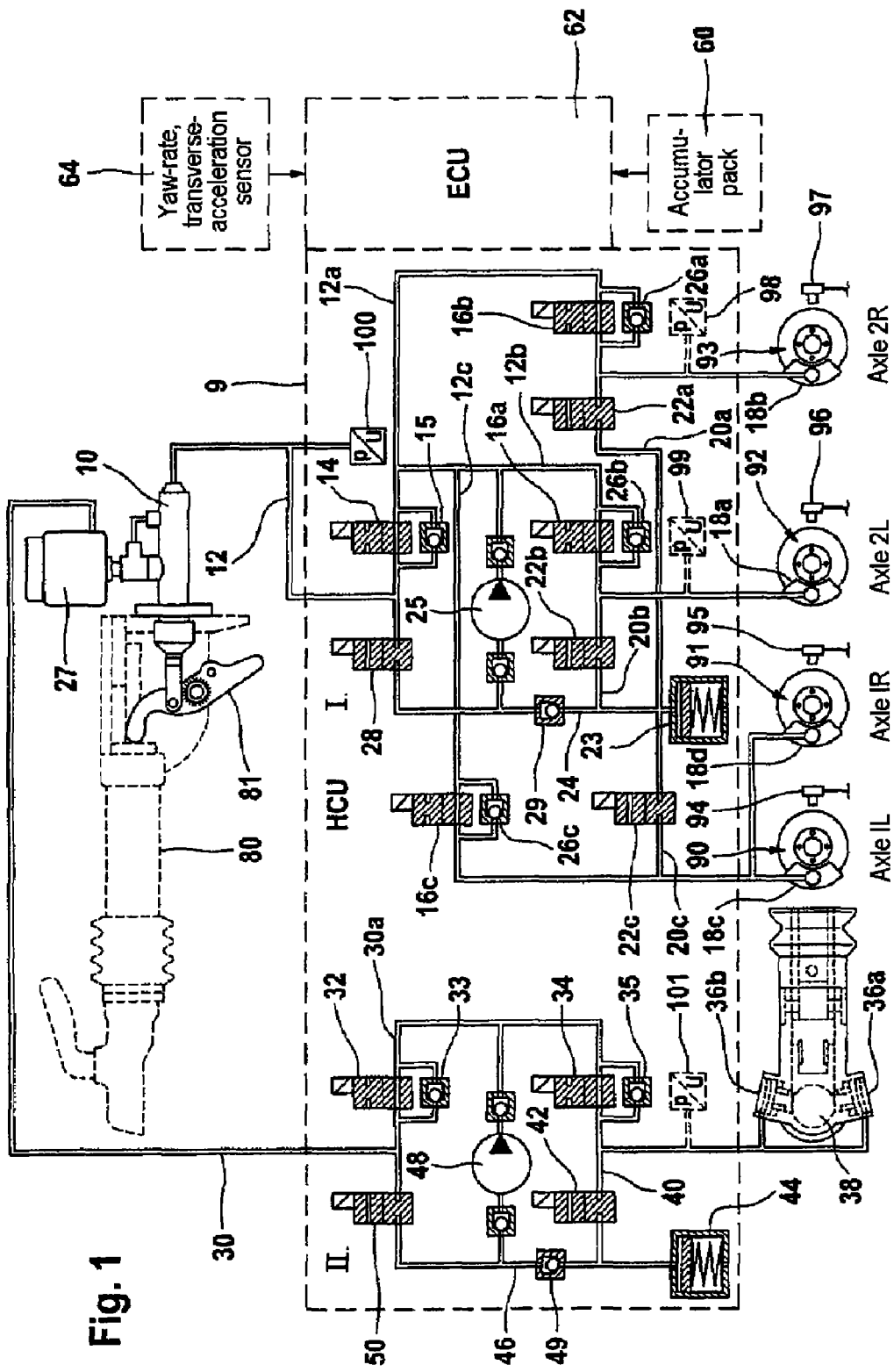
FIG. 1 shows a diagrammatic illustration of the circuit of the hydraulic trailer brake system according to aspects of the invention.

The hydraulic trailer brake system for drive stabilization, illustrated in FIG. 1, has pressure or force transmission circuits which are designated as a whole by 9. One brake pressure transmission circuit I consists of a brake cylinder 10 of an inertia brake 80 which is actuated by means of a mechanical unit 81 of the inertia brake 80. Arranged on the brake cylinder 10 is a reservoir 27 which contains a pressure medium and which is connected in the brake release position to the working chamber of the brake cylinder 10. The brake pressure transmission circuit illustrated has a brake line 12 connected to at least one working chamber of the brake cylinder 10 and having a first isolating valve 14 which in its rest position forms an open passage for the brake line 12. Connected in parallel to the isolating valve 14 is a nonreturn valve 15 which opens from the direction of the brake cylinder 10. The isolating valve 14 is actuated electromagnetically in the conventional way. However, variations in which hydraulic actuation takes place may also be envisaged.

The brake line 12 branches into three brake pressure sublines 12a, 12b, 12c which lead to wheel brakes 18a to 18d. The brake pressure sublines 12a, 12b lead here in each case to a wheel brake 18a or 18b of a trailer axle, while the brake pressure subline 12c leads to the pair of wheel brakes 18c and 18d of a trailer axle. The brake pressure sublines contain in each case an electromagnetically actuable inlet valve 16a, 16b, 16c which are open in their rest position and can be switched into a blocking position by the actuating magnet being excited. A nonreturn valve 26a to 26c is connected in parallel to each inlet valve 16a to 16c and opens from the direction of the wheel brakes 18a, 18b or 18c and 18d. Connected in parallel to these wheel brake circuits 12, 12a to 12c is what is known as a recirculating circuit which consists of return lines 20a to 20c with a pressure medium pump 25. The wheel brakes 18a and 18b, in each case via an outlet valve 22a and 22b, and the wheel brakes 18c and 18d, via an outlet valve 22c, are connected via the return lines 20a to 20c to the line 24 and consequently to the suction side of the pressure medium pump 25, the delivery side of which is connected to the brake pressure sublines 12a to 12c at a point of issue between the isolating valve 14 and the inlets valves 16a to 16c.

The conveying pump 25 is designed as a reciprocating pump with a delivery valve and a suction valve which are not illustrated in any more detail. Located on the suction side of the pressure medium pump 25 is a low-pressure accumulator 23 which is connected to the return lines 20a to 20c.

In the connection between the low-pressure accumulator 23 and the pressure medium pump 25 is inserted a pretensioned nonreturn valve 29 opening to the pump.

Furthermore, the suction side of the pump 25 is connected via the additional line 24 having a first changeover valve 28 to the brake cylinder 10.

The pressure or force transmission circuit 9 has a second control circuit II with a line 30 which is connected to the reservoir 27 and which branches into a pressure subline 30a and a line 46. The pressure subline 30a leads via a second isolating valve 32 and a parallel-connected nonreturn valve 33 to actuators 36a, 36b of a stabilizing coupling 38 of the trailer. Via branches of the pressure subline 30a, the two actuators 36a, 36b can be acted upon by the pressure generated in the lines 30, 30a. Alternatively, it is also possible to act upon the actuators individually with the hydraulic medium contained in the reservoir 27, in that two identical pressure transmission circuits are provided. Furthermore, the pressure line 30a contains an electromagnetically actuable inlet valve 34 which is open in its rest position and which can be switched into a blocking position by the actuating magnet being excited. A nonreturn valve 35 which opens in the direction of the reservoir 27 is connected in parallel to the inlet valve 34. Connected in parallel to this pressure circuit 30, 30a is what is known as a recirculating circuit which consists of return lines 40, 46 with a pressure medium pump 48. The actuators 36a, 36b are connected via an outlet valve 42 arranged in the line 40 to the line 46 and consequently to the suction side of the pressure medium pump 48, the delivery side of which is connected to the brake pressure subline 30a at a point of issue between the isolating valve 32 and the inlet valve 34.

The conveying pump 48 is designed as a reciprocating pump with a delivery valve and a suction valve which are not illustrated in any more detail. Located on the suction side of the pressure medium pump 48 is a low-pressure accumulator 44 which is connected to the return lines 40, 46.

In the connection between the low-pressure accumulator 44 and the pressure medium pump 48 is inserted a pretensioned nonreturn valve 49 opening to the pump.

Furthermore, the suction side of the pump 48 is connected to the reservoir 27 via the line 46 and a second changeover valve 50.

As can be seen from FIG. 1, the pressure circuit for the actuators 36a, 36b of the stabilizing coupling 38 and the brake pressure circuit for the wheel brakes 18a to 18d are advantageously set up identically. While in the brake pressure circuit, three wheel brakes 18a to 18d, to be precise in each case the wheel brake 18a and the wheel brake 18b and a pair of wheel brakes 18c and 18d, are activated separately, in the pressure circuit of the stabilizing coupling one "actuator" only, to be precise the two cylinder/piston units, is activated.

Moreover, the pressure or force transmission circuit 9 has an electronic control unit 62. Control or regulating signals for the valves and the pumps 25, 48 are generated in the electronic control unit on the basis of the wheel rotational speed sensors 94 to 97, assigned to the wheels 90 to 93 illustrated merely diagrammatically, and of the pressure sensors 98, 99, 100, 101 assigned to the pressure or brake circuits or the further sensors 64, for example the sensors of a sensor cluster, such as, for example, transverse-acceleration sensors, yaw-rate sensors, longitudinal-acceleration sensors. The energy supply to the electronic control unit 62 takes place in this case via accumulators, that is to say an accumulator pack 60, which is connected to the vehicle battery via a supply line between the vehicle and the trailer.

The device operates as follows:

Braking:

The braking of the trailer by means of the inertia brake 80 takes place whenever the trailer speed is higher than the driving speed of the traction vehicle. In this case, by means of the mechanical unit 81 of the inertia brake 80, pressure medium is displaced from the master cylinder 10 via the brake line 12, open isolating valve 14 and open inlet valves 16a to 16c to the wheel brakes 18a to 18d. The trailer is braked via all four wheels 90 to 93.

ABS Control:

By means of rotational speed signals from the wheel rotational speed sensors 90 to 93 which are made available to the control unit 62, the circumferential speeds of each individual wheel are determined and are evaluated logically in terms of brake slip by means of the driving speed calculated in the control unit 62. When, as a rule, the brake slip rises above 8 to 30 percent or in this case a wheel of the wheel brakes 18a to 18d locks (100 percent brake slip), the respective inlet valve 16a to 16c is closed, so that the pressure medium conveyed from the master cylinder 10 into the brake line 12 no longer arrives at the corresponding wheel. By the respective outlet valve 22a to 22c being opened, a pressure drop occurs, in that pressure medium is discharged from the respective wheel brake 18a to 18d into the low-pressure accumulator 23. The pressure medium of the low-pressure accumulator 23 can be recirculated into the reservoir 27 at a later time point by means of the pump.

Stability Braking:

The build-up of pressure in the wheel brake circuits of the wheel brakes 18a, 18b, 18c and 18d takes place, with the changeover valve 28 open and the isolating valve 14 closed, via the activation signals of the control unit 62 when the isolating valve 14 is open currentlessly in the initial position and the changeover valve 28 is currentlessly closed. In this case, by means of the pressure medium pump 25, pressure medium is conveyed via the master cylinder 10 out of the reservoir 27 or the low-pressure accumulator 23 into the wheel brake circuits in which pressure medium is thus introduced according to the calculated brake pressure requirement. Activation in this case takes place as a function of the determined rolling movement of the trailer. The rolling movement is determined on the basis of the transverse-acceleration or yaw-rate or wheel rotational speed signals from the corresponding sensors 94 to 97, 64 which are evaluated logically in the control unit according to a program and assessed. Then, as a function of the evaluation result, the wheel brakes 18a or 18b are activated individually, specifically according to a program, essentially in phase opposition to the rolling movement, in order to damp the rolling movement. Another possibility is to activate the wheel brakes simultaneously. The two wheel brakes 18c and 18d can be activated simultaneously or even by being switched before or after via the common brake circuit in order to reduce the trailer speed.

When the trailer is damped, brake pressure is discharged into the low-pressure accumulator 23 via the opening of the respective outlet valves 22a to 22c and of the return lines 20a to 20c, the inlet valves 16a to 16c being closed.

When the rolling movement of the trailer is to be reduced by means of the ball-shaped coupling 38, the isolating valve 32 is closed and the changeover valve 50 is opened, and the pump 48 conveys pressure medium out of the reservoir 27 to the actuators 36a, 36b. The ball-shaped coupling is tensioned with increased frictional force.

The following design variants of FIGS. 2 to 8 all have the two separate circuits described in connection with FIG. 1, to be precise the activation circuit for the wheel brakes 18a to 18d and the activation circuit for the stabilizing coupling 38 or further components. The hydraulic trailer brake systems operate essentially correspondingly according to the functioning described previously in connection with FIG. 1. Deviations in functioning which arise from the modification of the circuit are in each case described individually. The same reference symbols are used for identical components, not all the reference symbols being included in the alternative design variants for the sake of clarity. It is possible in a simple way for a person skilled in the art to transfer the reference symbols from FIG. 1 to the respective components or structural parts of the corresponding circuit. Of course, individual circuits of FIGS. 1 to 8 may also be replaced by circuits of the other figures in each case, thus one axle with two wheels or more than one axle with more wheels can be activated by means of the trailer brake systems. For this purpose, merely, identical activation circuits have to be provided. Thus, two pairs of wheel brakes of two axles or else wheel brakes individually can be activated.

Figure 2:
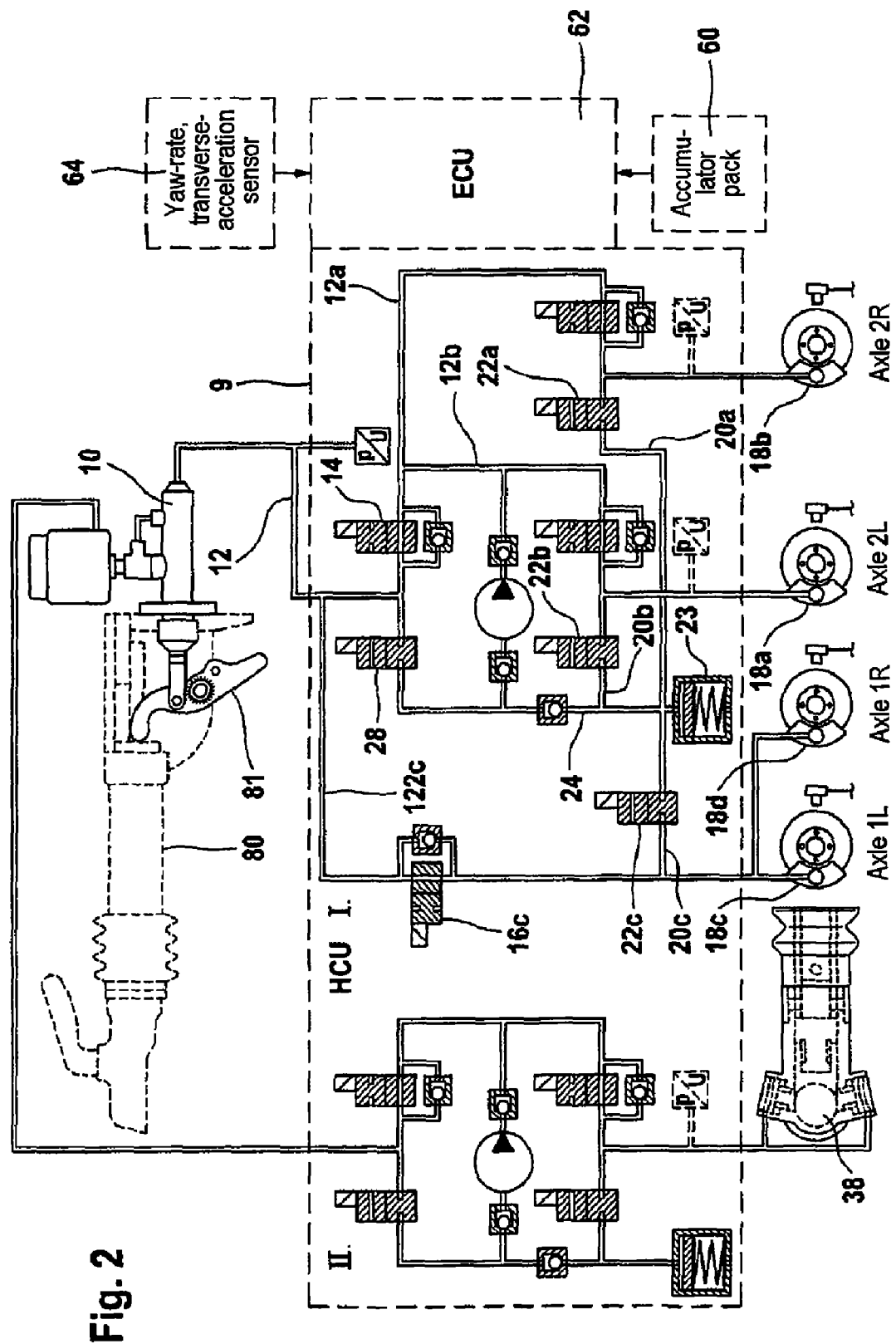
FIG. 2 shows an embodiment of the hydraulic circuit diagram illustrated in FIG. 1.

FIG. 2 shows an alternative, according to aspects of the invention, for the pressure or force transmission device 9 of FIG. 1. In contrast to the version in FIG. 1, in FIG. 2 the brake pressure subline 122c leading to the wheel brakes 18c and 18d and having the inlet valve 16c and outlet valve 22c branches upstream of the isolating valve 14 and the changeover valve 28. It is connected directed to the brake pressure line 12. By means of this design, pressure medium cannot be made available by the pump 25 to the wheel brakes 18c and 18d, that is to say to the pair of wheel brakes connected to the line 122c. By means of the inertia brake 80, however, brake pressure can be introduced into the brake circuit by means of the brake pressure subline 122c during stability control, that is to say during the side-related activation of the wheel brakes 18a or 18b, by means of the pump 25. The pressure reduction in the wheel brakes 18a to 18d takes place according to the way described in FIG. 1. The second activation circuit for the stabilizing coupling 38 corresponds to the version described in more detail in FIG. 1.

Figure 3:
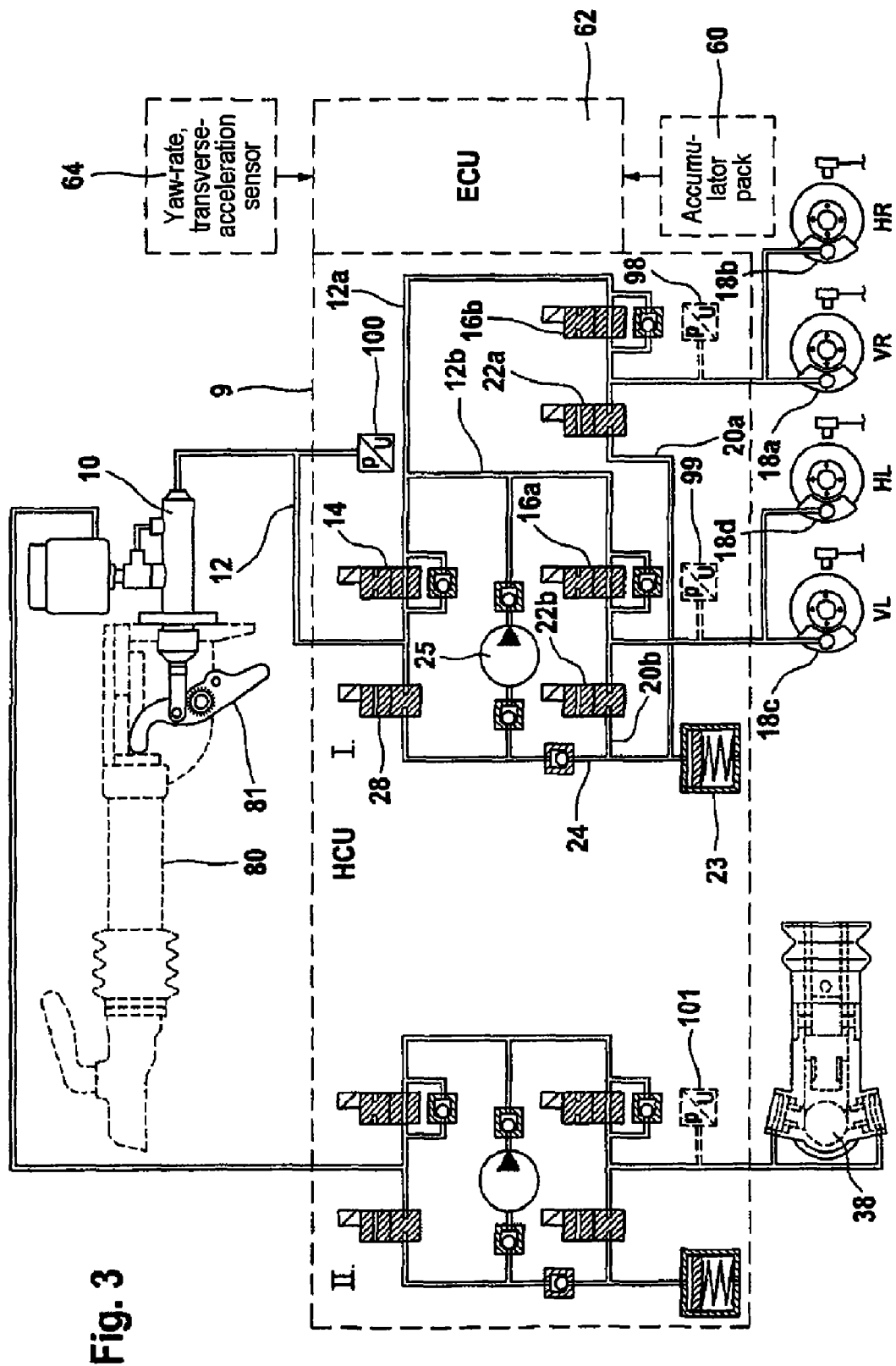
FIG. 3 shows a further embodiment of the hydraulic circuit diagram illustrated in FIG. 1.

FIG. 3 shows a further alternative, according to aspects of the invention, for the pressure or force transmission device 9 of FIG. 1. In contrast to FIG. 1, the wheel brakes 18a and 18b are connected correspondingly to the wheel brakes 18c and 18d described in FIG. 1. That is to say, the wheel brakes 18a and 18b or the pair of wheel brakes 18a, 18b can be activated only jointly via an inlet valve 16b and an outlet valve 22a. The brake pressure subline 12c of FIG. 1 having the inlet and outlet valve 16c and 22c is dispensed with. Here, too, the second activation circuit for the stabilizing coupling 38 corresponds to the version described in more detail in FIG. 1.

Figure 4:
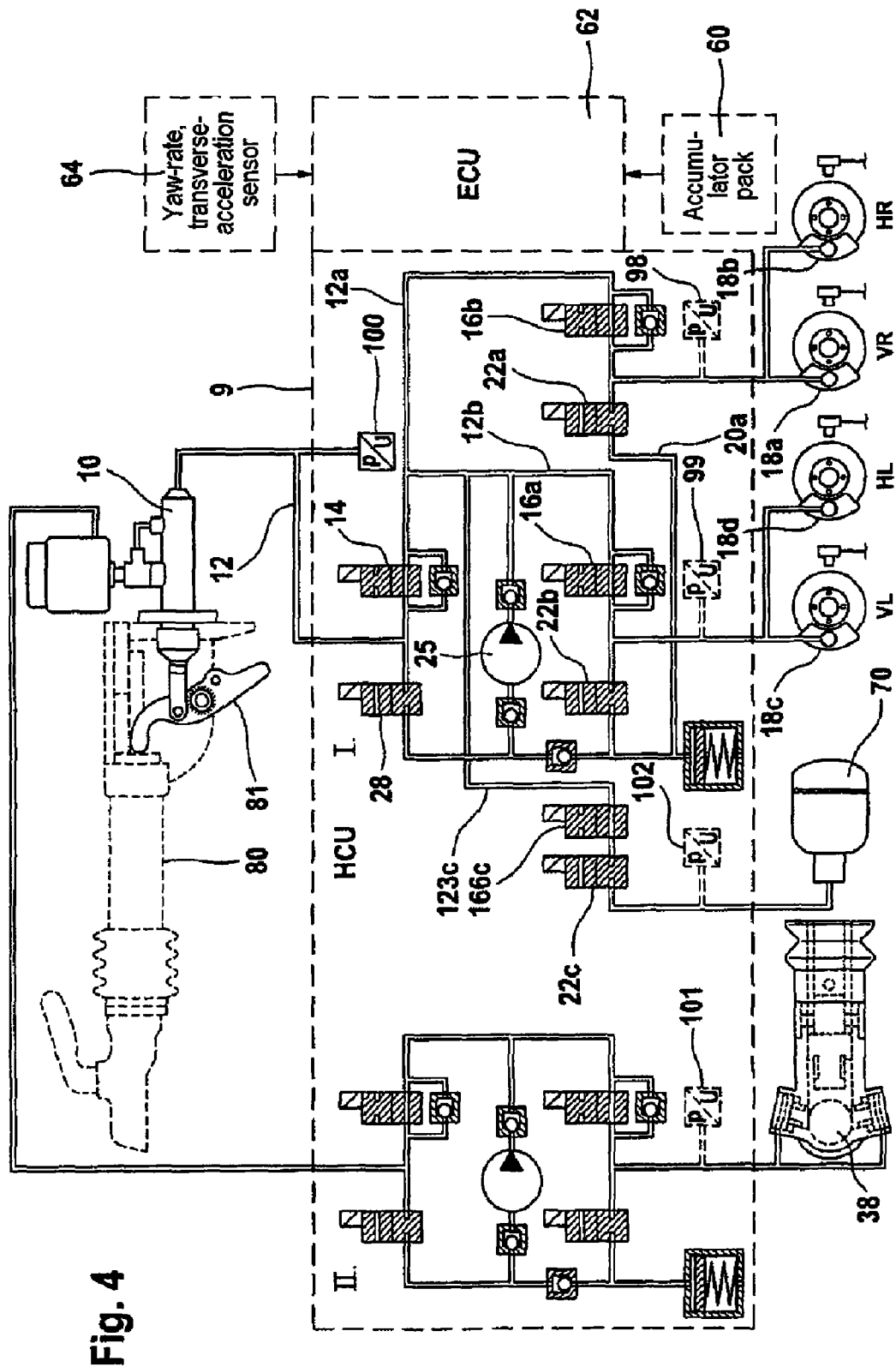
FIG. 4 shows a further embodiment of the hydraulic circuit diagram illustrated in FIG. 1.

FIG. 4 shows an alternative, according to aspects of the invention, for the pressure or force transmission device 9 of FIG. 1. Here, the wheel brakes 18a to 18d are activated according to the circuit diagram of the alternative according to FIG. 3. However, the alternative has, furthermore, the pressure subline 123c corresponding to the brake pressure subline 12c of FIG. 1, in which a high-pressure accumulator 70 is connected via an outlet valve 22c. A filter 166c is provided between the isolating valve 14 and the outlet valve 22c. The filter 166c is designed as a currentlessly open inlet valve without a nonreturn valve. Between the outlet valve 22c and the high-pressure accumulator 70 is arranged a further pressure sensor 102, by means of which the pressure of the high-pressure accumulator 70 can be determined.

Figure 5:
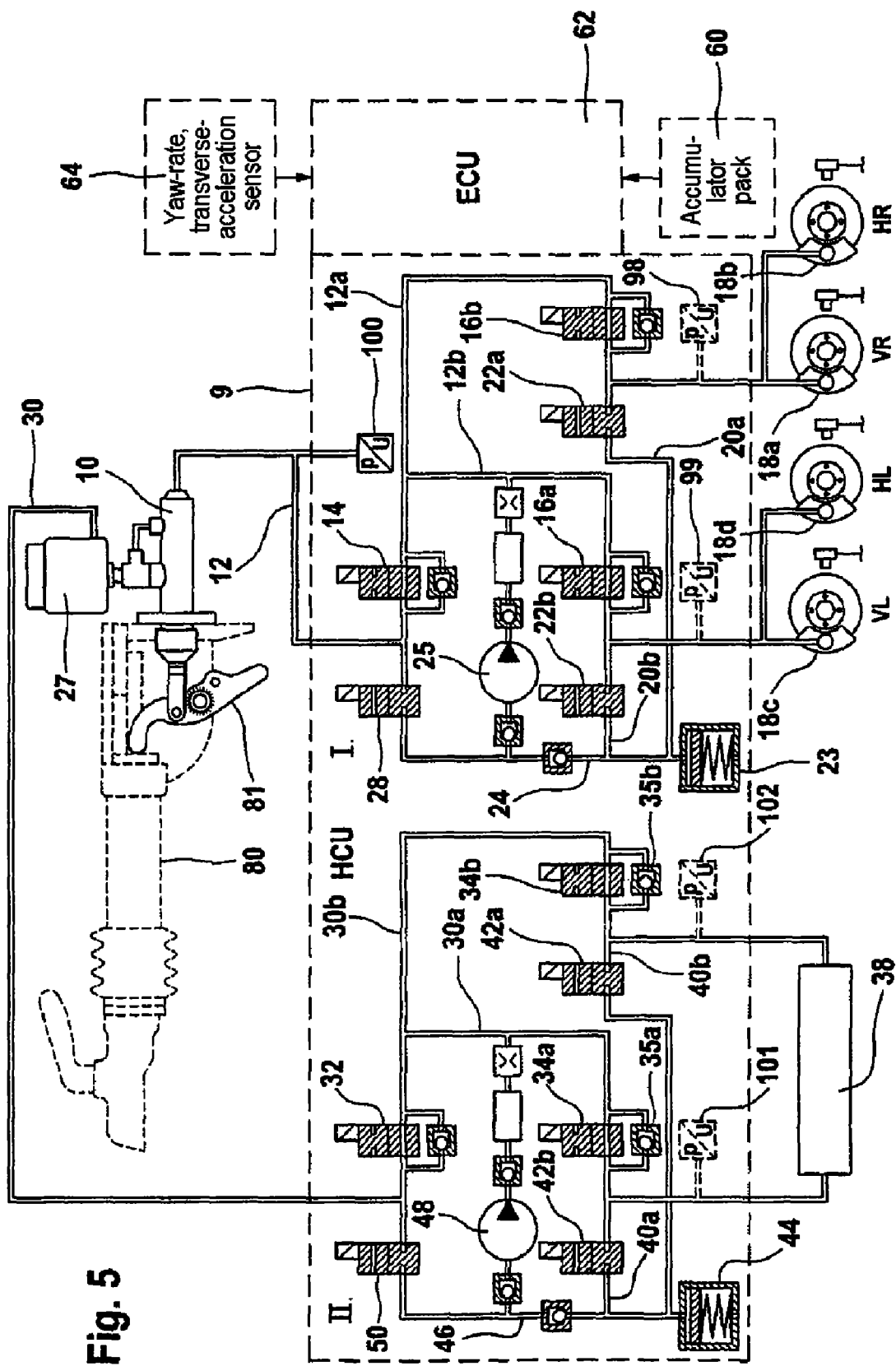
FIG. 5 shows a further embodiment of the hydraulic circuit diagram illustrated in FIG. 1 with a separate activation of the actuators of the ball-shaped stabilizing coupling.

FIG. 5 shows the pressure or force transmission device 9 illustrated in FIG. 1, with a modified activation of the ball-shaped stabilizing coupling 38, as compared with FIG. 1. As can be seen from FIG. 5, the actuators 36a, 36b of the stabilizing coupling 38 are connected to the reservoir 27 via the line 30. The line 30 branches downstream of the isolating valve 32 into pressure sublines 30a, 30b and downstream of the changeover valve 50 into a line 46. The pressure subline 30a leads via the inlet valve 34a with the nonreturn valve 35a to one of the actuators 36a or 36b, while the pressure subline 30b leads via the inlet valve 34b and nonreturn valve 35b in each case to the other actuator 36a or 36b of the stabilizing coupling 38. The pump 48 conveys pressure medium out of the reservoir to the actuators 36a, 36b in order to stabilize the trailer. Via the switching intervals (open/shut) of the isolating valve 32, then, a stipulated pressure determined by means of the pressure sensors 101, 102 for each actuator 36a and 36b can be introduced into the actuators 36a or 36b. For this purpose, the inlet valves 34a or 34b of the respective actuator can be closed or opened by means of the electronic control unit. The two pressure sublines 30a, 30b have the return lines 40a, 40b, described in connection with FIG. 1, in which an outlet valve 42a, 42b is arranged in each case. The return lines are connected to the low-pressure accumulator 44 and to the line 46.

Figure 6:
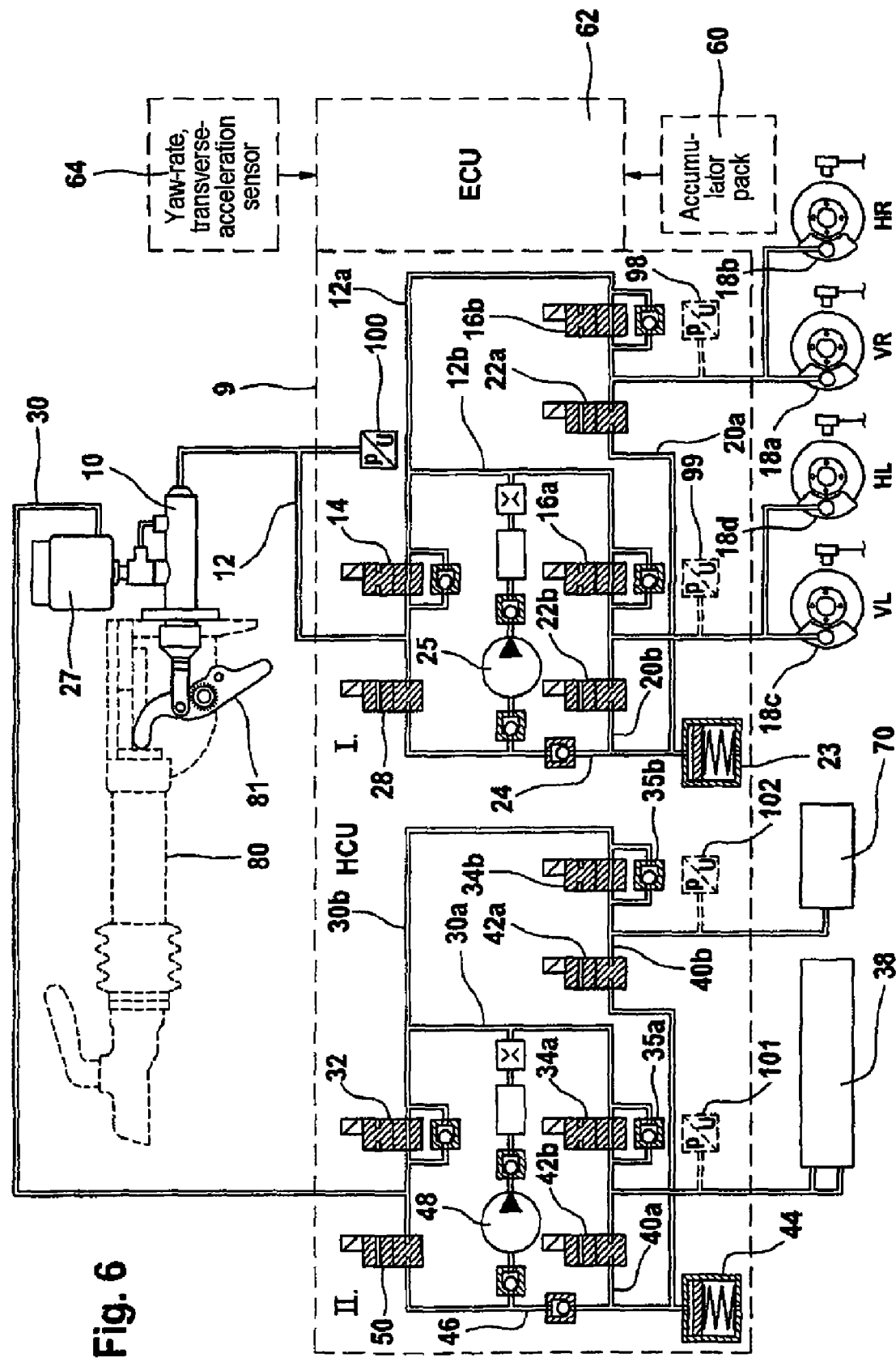
FIG. 6 shows a further embodiment of the hydraulic circuit diagram illustrated in FIG. 1 with a high-pressure accumulator.

FIG. 6 shows a modification of the stabilizing coupling circuit. In contrast to FIG. 5, hydraulic medium is introduced into the two actuators 36a, 36b of the stabilizing coupling 38 via the pressure subline 30a with the inlet valve 34a and with the nonreturn valve 35a. A high-pressure accumulator 70 is connected to the pressure subline 30b with the inlet valve 34b and the nonreturn valve 35b. The two pressure sublines 30a, 30b likewise have the return lines 40a, 40b, described in connection with FIG. 1, in each of which an outlet valve 42a, 42b is arranged. The return lines are connected to the low-pressure accumulator 44 and to the line 46.

Figure 7:
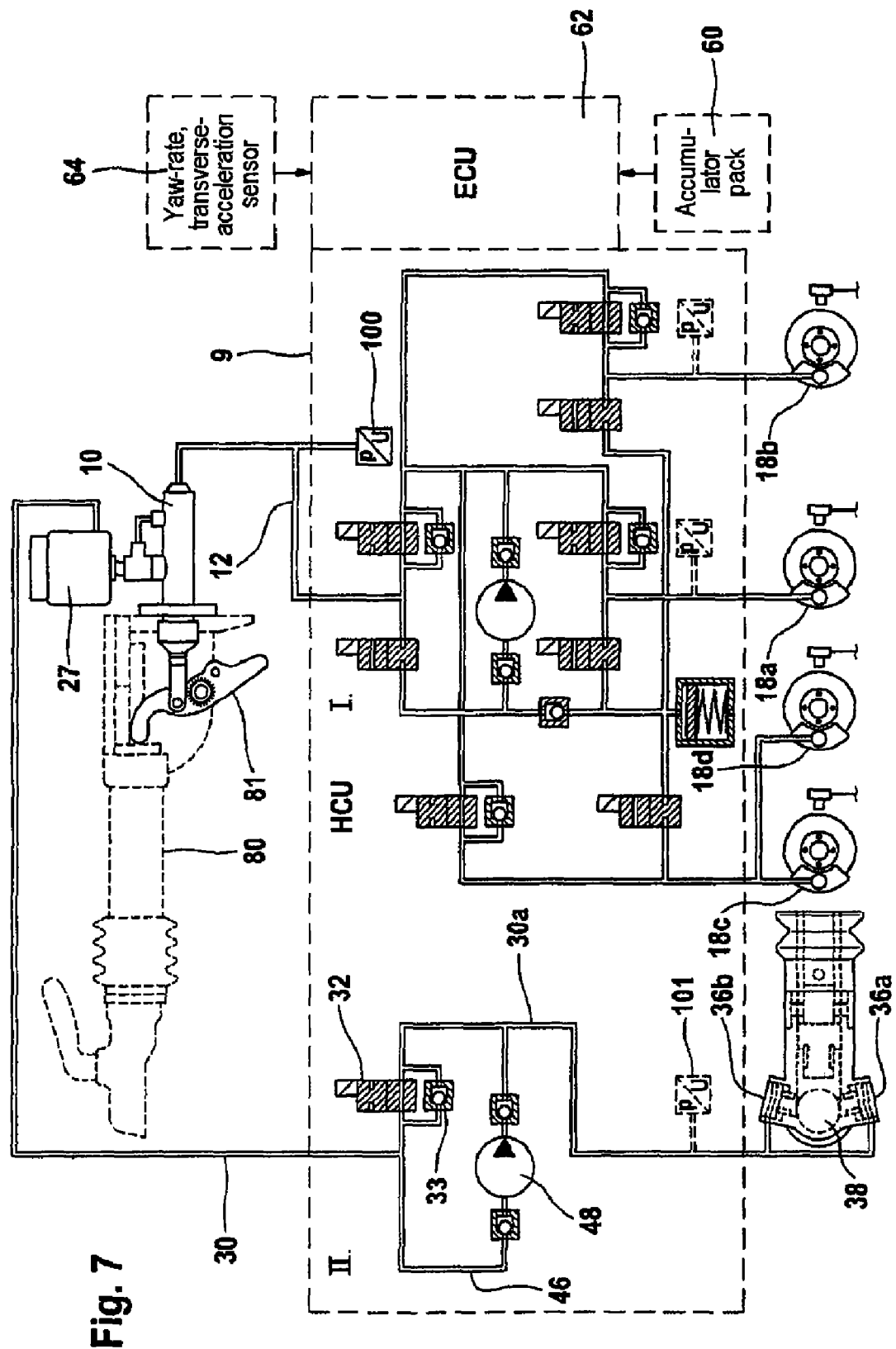
FIG. 7 shows an embodiment of the hydraulic circuit diagram illustrated in FIG. 1 with a simplified circuit for activating the ball-shaped stabilizing coupling.

FIG. 7 shows the pressure or force transmission device 9 illustrated in FIG. 1, with a modified activation of the ball-shaped stabilizing coupling 38, as compared with FIG. 1. The hydraulic circuit of the wheel brakes 18a to 18d connected to the brake line 12 corresponds in this case to the activation circuit illustrated and described in FIG. 1 and therefore does not need to be described in any more detail. As illustrated diagrammatically in FIG. 7, the actuators 36a, 36b of the stabilizing coupling 38 are connected to the reservoir 27 via the line 30. The line 30 branches into the pressure subline 30a and a line 46. A currentlessly open isolating valve 32 with a nonreturn valve 33 is arranged in the pressure subline 30a. Between the isolating valve 32 and the actuators 36a, 36b, the delivery side of the second pump 48 is connected to the pressure subline 30a, the suction side of which pump is connected to the line 46. In the pressure subline 30a, the pressure sensor 101 is arranged between the connection point of the suction side of the pump 48 and the actuators 36a, 36b of the stabilizing coupling 38. After the activation of the pump 48 by means of the electronic control unit 62, to stabilize the trailer, the pump 48 conveys pressure medium out of the reservoir 27 to the actuators 36a, 36b. Via the switching intervals "open/shut" of the isolating valve 32, then, a stipulated pressure determined by means of the pressure sensor 101 can be set in the actuators 36a, 36b.

Figure 8:
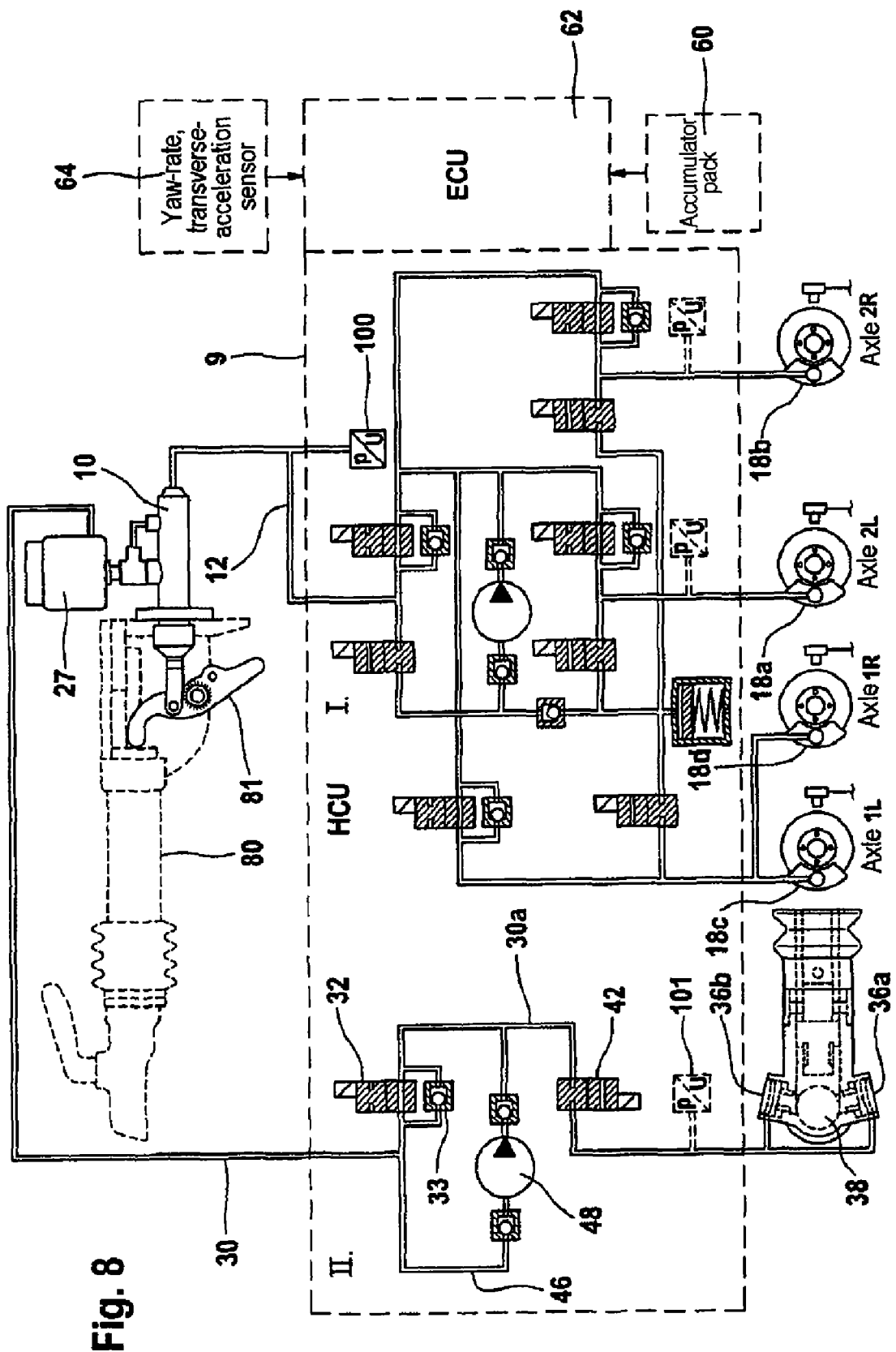
FIG. 8 shows an embodiment of the hydraulic circuit diagram illustrated in FIG. 1 with a modified ball-shaped coupling circuit.

FIG. 8 shows a modification of the stabilizing coupling circuit of FIG. 7. In contrast to the circuit variant of FIG. 7, a currentlessly closed outlet valve 42 is provided as a shutoff valve in the pressure subline 30a between the connection point of the suction side of the pump 48 and the connection point of the pressure sensor 101. By means of the valve 42, the pressure introduced into the actuators 36a, 36b of the stabilizing coupling can be blocked or held while the isolating valve 32 is open.

The following design variants of FIGS. 9 to 14 all have the two separate activation circuits described in connection with FIG. 1, but, in contrast to the preceding design variants, the two hydraulic activation circuits both comprise the activation of wheel brakes 18a to 18d, that activation of the stabilizing coupling 38 or further components being additionally provided in the case of one activation circuit. The hydraulic trailer brake systems operate essentially correspondingly according to the functioning described previously in connection with FIG. 1. Deviations in functioning which arise from the modification of the circuit are in each case described individually. The same reference symbols are used for identical components, not all the reference symbols being included in the alternative design variants for the sake of clarity. It is possible in a simple way for a person skilled in the art to transfer the reference symbols from FIG. 1 to the respective components or structural parts of the corresponding circuit. Of course, individual circuits of FIGS. 1 to 14 may also be replaced by circuits of the other figures in each case, thus one axle with two wheels or more than one axle with more wheels can be activated by means of the trailer brake systems. For this purpose, merely, identical activation circuits have to be provided. Thus, two pairs of wheel brakes of two axles or else wheel brakes individually can be activated. By the activation of the wheel brakes 18a, 18b or 18c, 18d being allocated to two activation circuits, each with a pressure medium pump 25, 48, pressure-dynamic benefits can be achieved.

Figure 9:
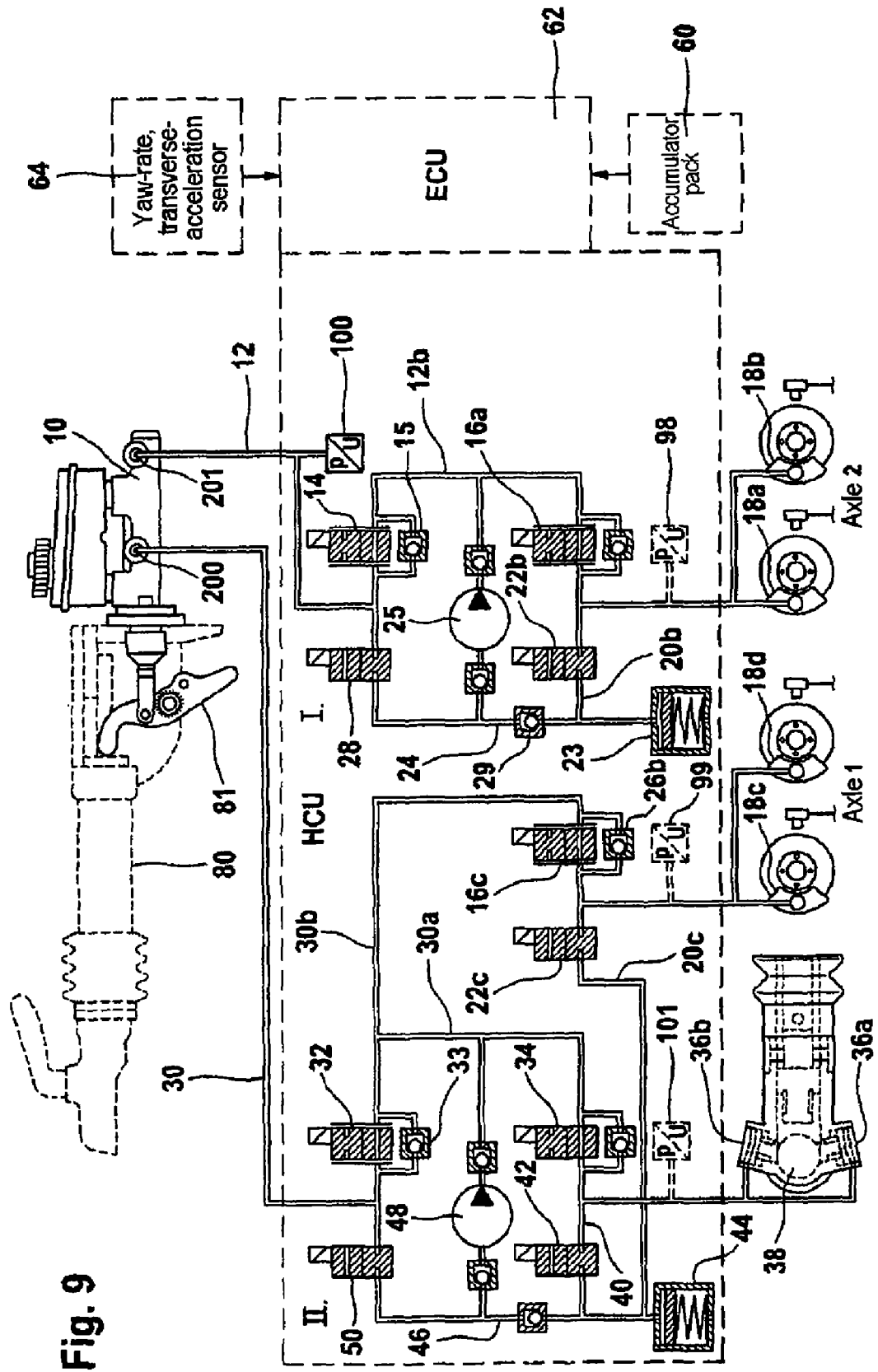
FIG. 9 shows an embodiment of the hydraulic circuit diagram illustrated in FIG. 1 with a brake master cylinder having two pressure chambers and with a brake circuit, provided in the activation circuit of the ball-shaped stabilizing coupling, for a pair of wheel brakes.

FIG. 9 shows a hydraulic trailer brake system with a tandem brake master cylinder 10 which has two pressure chambers with two separate outlets 200, 201. The two control circuits I, II are supplied with hydraulic medium via the two pressure chambers of the brake master cylinder 10. In the control circuit I supplying the wheel brakes 18a, 18b with a hydraulic medium, the brake line 12 is connected to the outlet 201 of the first pressure chamber, and, in the control circuit II, the pressure line 30 is connected to the outlet 200 in the second pressure chamber. The brake circuit I with the brake line 12 has, downstream of the first isolating valve 14 with the nonreturn valve 15, a brake pressure subline 12b which is connected via the first inlet valve 16a arranged in it to the wheel brakes 18a, 18b of a first trailer axle. The wheel brakes 18a, 18b are connected to a return line 20b in which a first currentlessly closed outlet valve 22b is arranged. The return line 20b is connected to the first low-pressure accumulator 23 and, via a line 24, to the suction side of the first pump 25. In the line 24 is provided a nonreturn valve 29 which opens to the suction side of the pump and is also connected to the first changeover valve 28 via the line 24. The changeover valve 28 is connected to the brake line 12. The second hydraulic control circuit II provides, correspondingly to the version according to FIG. 1, a hydraulic circuit for the stabilizing coupling 38, in such a way that the pressure line 30 is connected via a second isolating valve 32 with a nonreturn valve 33, in a pressure subline 30a having a second inlet valve 34, to the actuators 36a, 36b of the ball-shaped stabilizing coupling 38. In contrast to the design in FIG. 1, the inlet valve 34 is designed as a currentlessly closed shutoff valve without a nonreturn valve. By means of the inlet valve 34 designed as a shutoff valve, the pressure in the actuators 36a, 36b can be blocked, while the isolating valve 32 is open. The pressure line 30 is connected to the wheel brakes 18c, 18d of a second trailer axle via a further pressure subline 30b and a second currentlessly open inlet valve 16c with a nonreturn valve 26b. A pressure sensor 101 for determining the pressure in the actuators 36a, 36b is arranged between the actuators and the shutoff valve 34 in the pressure subline 30a. The actuators 36a, 36b and the wheel brakes 18c, 18d of the second control circuit II are connected in each case to a return line 20c, 40 in which a second outlet valve 22c, 42 is arranged in each case. The two return lines 20c, 40 are connected in each case to the second low-pressure accumulator 44 and, via a line 46, to the suction side of the second pump 48 and to the second changeover valve 50. The changeover valve 50 is connected to the line 30.

Braking:

The braking of the trailer by means of the inertia brake 80 takes place whenever the trailer speed is higher than the driving speed of the traction vehicle. In this case, by means of the mechanical unit 81 of the inertia brake 80, pressure medium is displaced from the first pressure chamber of the tandem brake master cylinder 10 via brake line 12, open isolating valve 14 and open inlet valve 16a to the wheel brakes 18a, 18b. The changeover valve 28 and the currentlessly closed outlet valve 22b are closed. Furthermore, hydraulic medium is introduced into the wheel brakes 18c and 18d from the second pressure chamber of the tandem brake master cylinder 10 via the pressure line 30, the open isolating valve 32 and the open inlet valve 16c. Via the switching intervals "open/shut" of the inlet valve 16c, then, a stipulated pressure determined by means of the pressure sensor 99 can be set in the wheel brakes 18c, 18d. The outlet valve 22c and the shutoff valve 34 of the stabilizing coupling are closed. The trailer can be braked via all four wheels 90 to 93.

Stability Braking:

The build-up of pressure in the wheel brake circuits, separate in this design variant, for the wheel brakes 18*a* and 18*b* or 18*c* and 18*d* takes place with the changeover valves 28 and 50 open and the isolating valves 14 and 32 closed via the activation signals of the control unit 62 when the isolating valves 14, 32 are currentlessly open in the initial position and the changeover valves 28, 50 are currentlessly closed. In this case, by means of the two pressure medium pumps 25, 48, pressure medium is conveyed via the master cylinder 10 out of the reservoir 27 or the low-pressure accumulators 23, 44 into the control circuits I, II of the wheel brake circuits in which pressure medium is thus introduced according to the calculated brake pressure requirement. It is determined via the pressure sensors 98, 99 whether the brake pressure requirements are set in the wheel brakes 18*a* to 18*d*. Activation in this case takes place as a function of the determined rolling movement of the trailer. The rolling movement is determined on the basis of transverse-acceleration or yaw-rate or wheel rotational speed signals from the corresponding sensors 94 to 97, 64 which are evaluated logically in the control unit according to a program and are assessed. As a function of the evaluation result, the wheel brakes 18*a* to 18*d* of a trailer axle are then activated according to a program in order to damp the rolling movement.

Another possibility is to activate the wheel brakes individually. For example, the two wheel brakes 18*c* and 18*d* of the second control circuit II can be activated simultaneously or else by switching before or after, in order to reduce the trailer speed. In parallel with this, in the control circuit II, the shutoff valve 34 can be opened and a hydraulic medium can be introduced into the actuators 36*a*, 36*b*. Via the shutoff valve 34, then, a stipulated pressure determined by means of the pressure sensor 101 in the actuators 36*a*, 36*b* can be blocked. The rolling movement of the trailer can thereby be reduced by means of the ball-shaped stabilizing coupling 38, in that the ball-shaped coupling is tensioned with increased frictional force.

When the trailer is damped, brake pressure is discharged into the low-pressure accumulators 23, 44 via the opening of the respective outlet valves 22*b*, 22*c* of the return lines 20*b*, 20*c*, the inlet valves 16*a*, 16*c* being closed.

Figure 10:
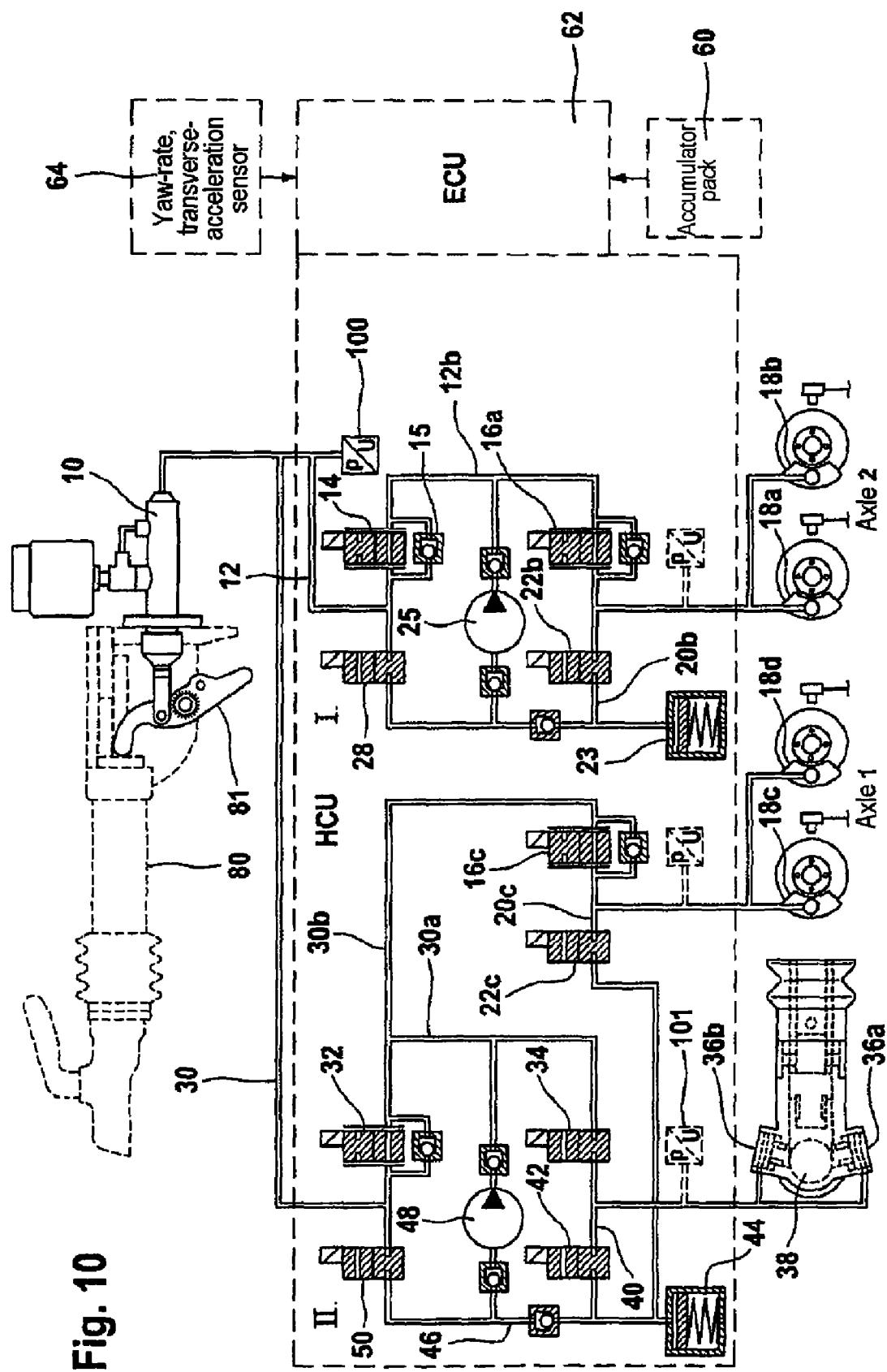
FIG. 10 shows an embodiment of the hydraulic circuit diagram illustrated in FIG. 9 with a brake master cylinder having only one pressure chamber.

FIG. 10 shows a design variant of FIG. 9 in which there is no tandem brake master cylinder with two pressure chambers provided, but, instead, a brake master cylinder 10 with only one pressure chamber as the essential difference. In this case, the brake master cylinder 10 is connected to the second pressure line 30 via the brake line 12. Thus, in the pressure line 30, the second isolating valve 32 is connected in the pressure subline 30*a* via the second inlet valve 34 to the actuators 36*a*, 36*b* of the ball-shaped stabilizing coupling 38 and via the pressure subline 30*b* and the second inlet valve 16*c* to the wheel brakes 18*c*, 18*d* of the second trailer axle. The actuators 36*a*, 36*b* and the wheel brakes 18*c*, 18*d* are in each case connected to a return line 20*c*, 40 in each of which a second outlet valve 22*c*, 42 is arranged, the return lines 20*c*, 40 being connected to the second low-pressure accumulator 44. Furthermore, as already described in FIG. 9, the return lines 20*c*, 40 are connected via the line 46 to the suction side of the second pump 48 and to the second changeover valve 50. The changeover valve 50 is connected to the second pressure line 30.

Since the control circuit I is set up identically to the control circuit I illustrated and described in FIG. 9, with the exception of the already mentioned connection of the pressure line 30 to the brake line 12, in connection with FIG. 10 reference may be made to the description of FIG. 9. The operation of the hydraulic trailer brake system also corresponds to that described in connection with FIG. 9, except that the two control circuits I, II are not supplied with a fluid by different pressure chambers, but by a common pressure chamber of the brake master cylinder 10.

Figure 11:
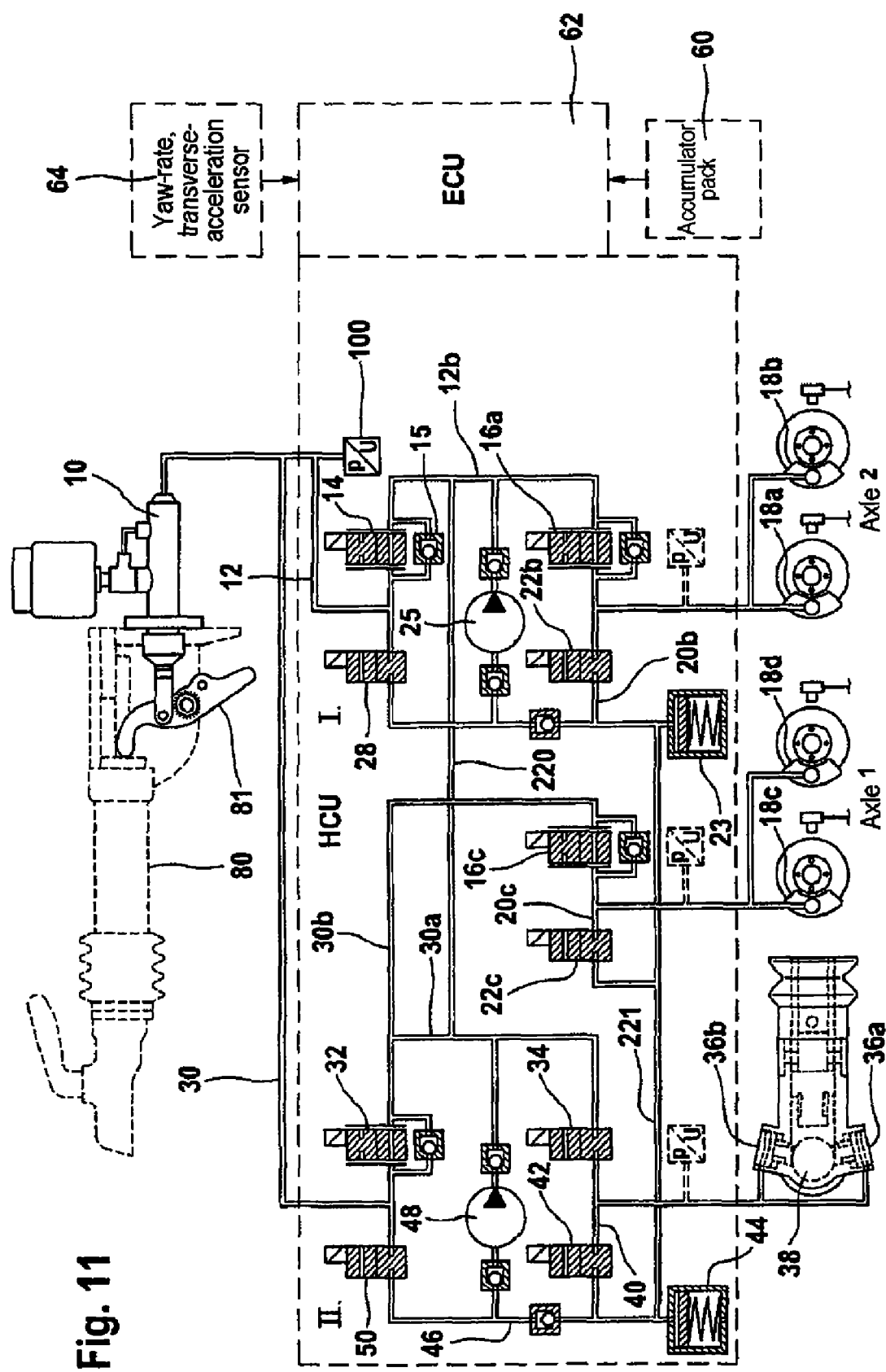
FIG. 11 shows an embodiment of the hydraulic circuit diagram illustrated in FIG. 10 with "short-circuited" pumps and low-pressure accumulators of the two circuits.

FIG. 11 shows a hydraulic trailer brake system, which, as compared with the design variant according to FIG. 10, provides for the return lines 20*b*, 20*c* having the first outlet valve 22*b* and the second outlet valve 22*c* to be connected to the first low-pressure accumulator 23 and to the second low-pressure accumulator 44 via a connecting line 221. In this case, the delivery sides of the first pressure medium pump 25 and of the second pressure medium pump 48 are also connected to one another via a connecting line 220. In this case, the connecting line 220 is connected to the brake line 12*b* of the first control circuit I between the first isolating valve 14 having the nonreturn valve 15 and the connection point of the bypass line to the first pressure medium pump 25. The other side of the connecting line 220 is connected to the pressure subline 30*a* of the second control circuit II between the second isolating valve 32 and the connection point of the bypass line to the second pressure medium pump 48. By means of the hydraulically "short-circuited" pressure medium pumps 25, 48, pressure medium can be conveyed into one of the two wheel brakes 18*a*, 18*b* or 18*c*, 18*d* by means of the two pumps, with the result that a faster build-up of pressure in the pair of wheel brakes and consequently an improved damping of the trailer during rolling are achieved. Correspondingly, the low-pressure accumulators 23, 44 are "short-circuited" in order to achieve a balanced pressure reduction with better volume distribution. By means of this design, the electronic control unit 62 can brake a pair of wheel brakes 18*a*, 18*b* or 18*c*, 18*d* of one axle according to specific criteria in a highly dynamic way by means of the two pressure medium pumps 25, 48, while the other axle with the other pair of wheel brakes can be braked according to identical or other criteria at another time point.

Figure 12:
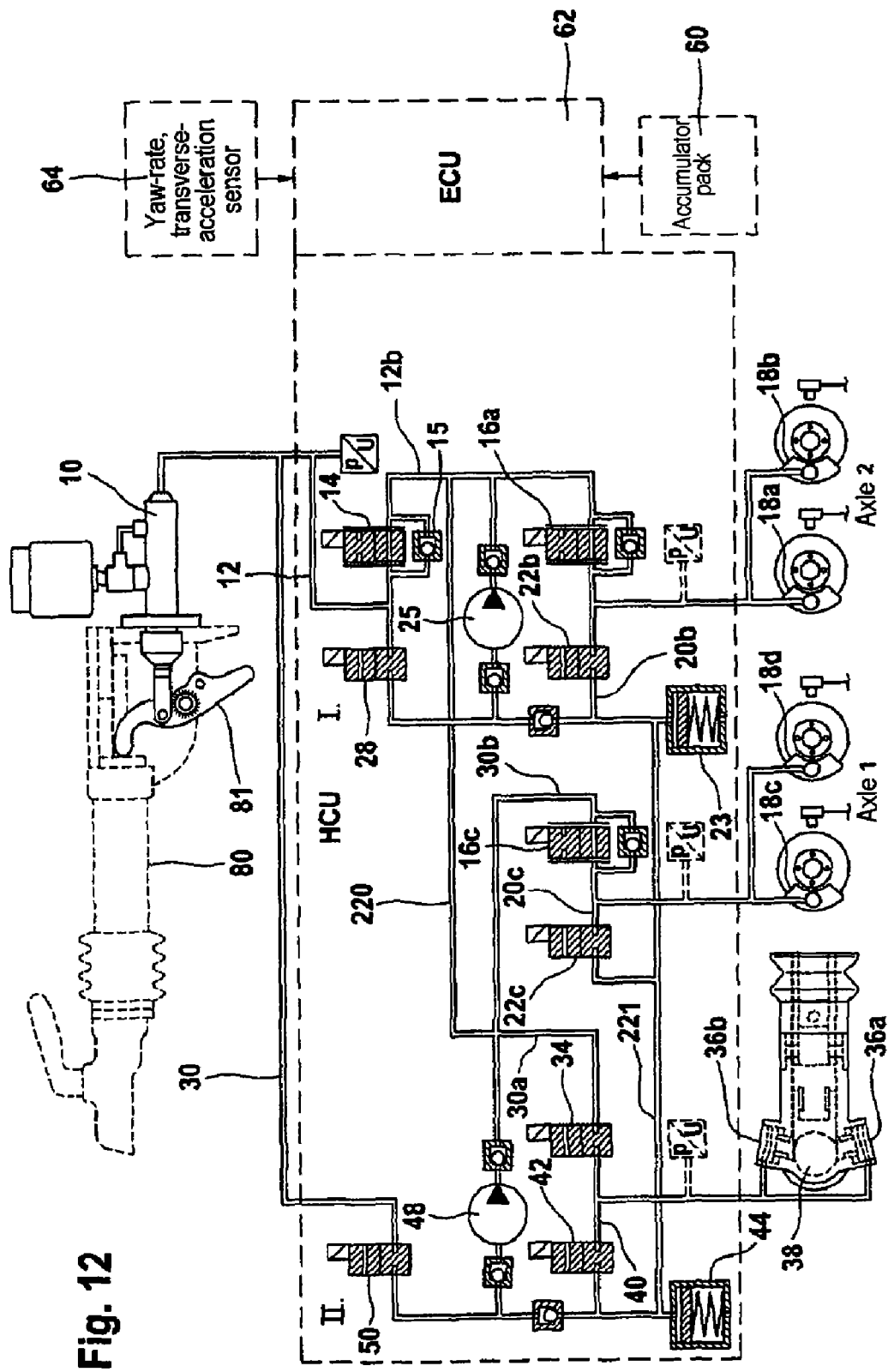
FIG. 12 shows an embodiment of the hydraulic circuit diagram illustrated in FIG. 11 with "short-circuited" pumps and low-pressure accumulators of the two circuits, without the isolating valve of the second ball-shaped stabilizing coupling circuit.

FIG. 12 shows a development of the hydraulic trailer brake system according to FIG. 11. In contrast to the design in FIG. 11, the second isolating valve 32 of the second control circuit II is dispensed with here. The brake master cylinder 10 is therefore connected to the suction side of the second pressure medium pump 48 by means of the second pressure line 30 via a second changeover valve 50. The delivery side of the pump 48 is connected to the actuators 36*a*, 36*b* of the ball-shaped stabilizing coupling 38 via the pressure subline 30*a* having the currentlessly closed inlet valve 34 designed as a shutoff valve. The pressure subline 30*b* having the inlet valve 16*c* connects the wheel brakes 18*c*, 18*d* of a second trailer axle to the pressure subline 30*a*. The actuators 36*a*, 36*b* and the wheel brakes 18*c*, 18*d* are in each case connected to a return line 20*c*, 40 in each of which a second outlet valve 22*c*, 42 is arranged. The return lines 20*c*, 40 are connected via the connecting line 221 to the first and the second low-pressure accumulator 23, 44 and via a line 46 to the suction side of the second pump 48 and to the second changeover valve 50. The changeover valve 50 is connected to the line 30. As described in FIG. 11, the control circuit I provides for the two wheel brakes 18*a*, 18*b* to be connected to the brake master cylinder 10 via a currentlessly open isolating valve 14, arranged in the brake line 12, 12*b* and having the nonreturn valve 15, and a changeover valve 28, for the wheel brakes 18*a*, 18*b* to be assigned a first inlet and a first outlet valve 16*a*; 22*b*, and for there to be provided in the bypass line, downstream of the changeover valve 28 and of the isolating valve 14, the first electrically activatable pressure medium pump 25, the suction side of which is connected to the changeover valve 28, to the first outlet valve 22b and to the first low-pressure accumulator 23 and the delivery side of which is connected to the first isolating valve 14 and to the first inlet valve 16. The delivery sides of the pumps 25, 48 are "short-circuited" via the connecting line 220 according to the design in FIG. 11.

Figure 13:
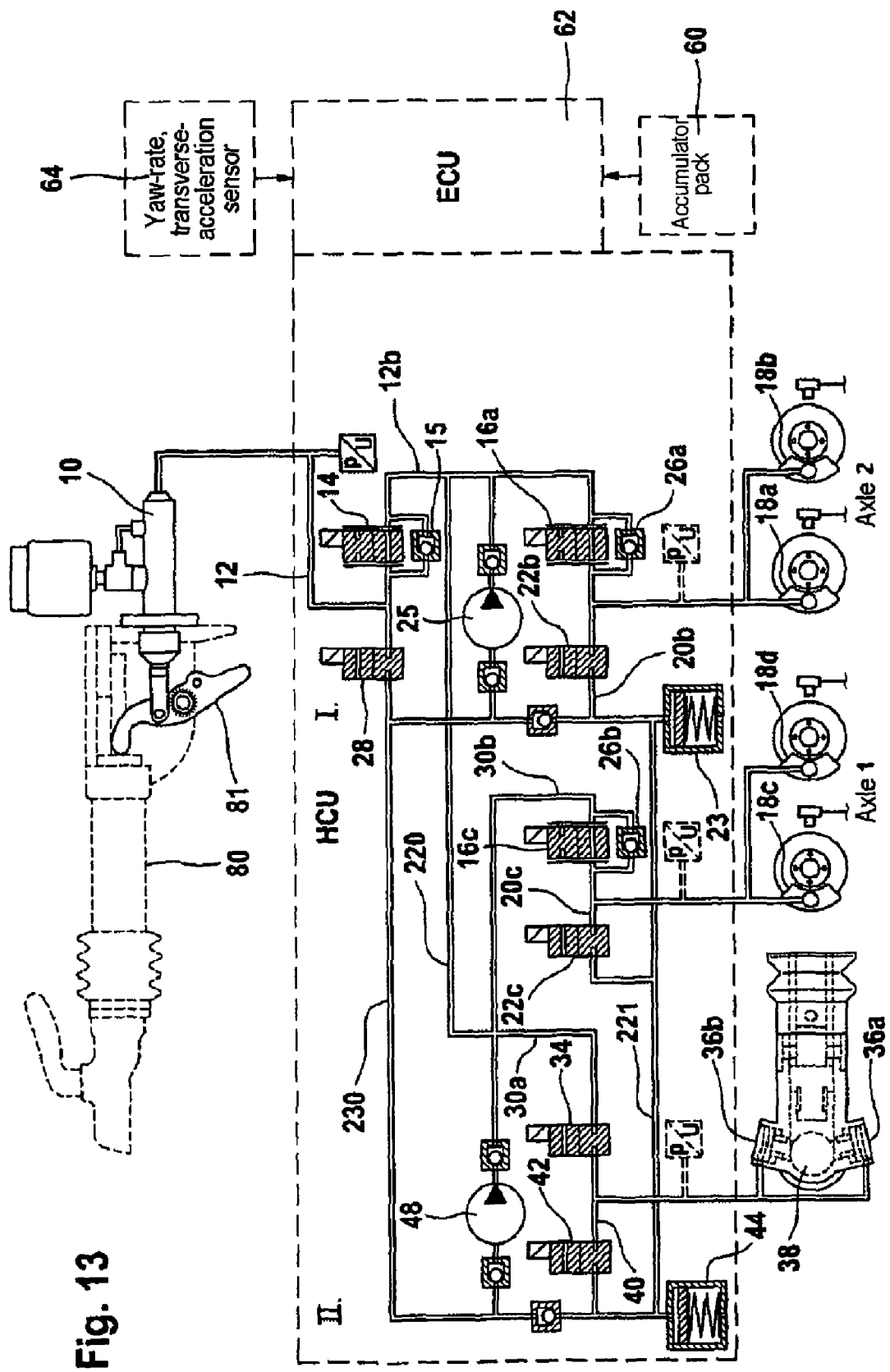
FIG. 13 shows an embodiment of the hydraulic circuit diagram illustrated in FIG. 12 with "short-circuited" pumps and low-pressure accumulators of the two circuits, without the isolating valve and the changeover valve of the second ball-shaped stabilizing coupling circuit.

FIG. 13 shows a development of the hydraulic trailer brake system according to FIG. 12. In contrast to the design of FIG. 12, in FIG. 13 there is no changeover valve 50 provided in the second control circuit II. As a result, the first changeover valve 28 is connected directly via a connecting line 230 to the suction side of the second pressure medium pump 48, to the second low-pressure accumulator 44 and to the second outlet valve 42. The second low-pressure accumulator 44 is connected to the first low-pressure accumulator 23 via the connecting line 221, and the delivery side of the second pressure medium pump 48 is connected to the delivery side of the first pressure medium pump 25 via the connecting line 220. The pressure subline 30a having the currentlessly closed inlet valve 34 designed as a shutoff valve connects the actuators 36a, 36b of the ball-shaped stabilizing coupling 38 to the pumps 25, 48, while the pressure subline 30b having the currentlessly open inlet valve 16c with the nonreturn valve 26b likewise connects the wheel brakes 18c, 18d of a second trailer axle to the pumps 25, 48. The wheel brakes 18c, 18d are connected to the connecting line 221 via the return line 20c and the outlet valve 22c.

Figure 14:
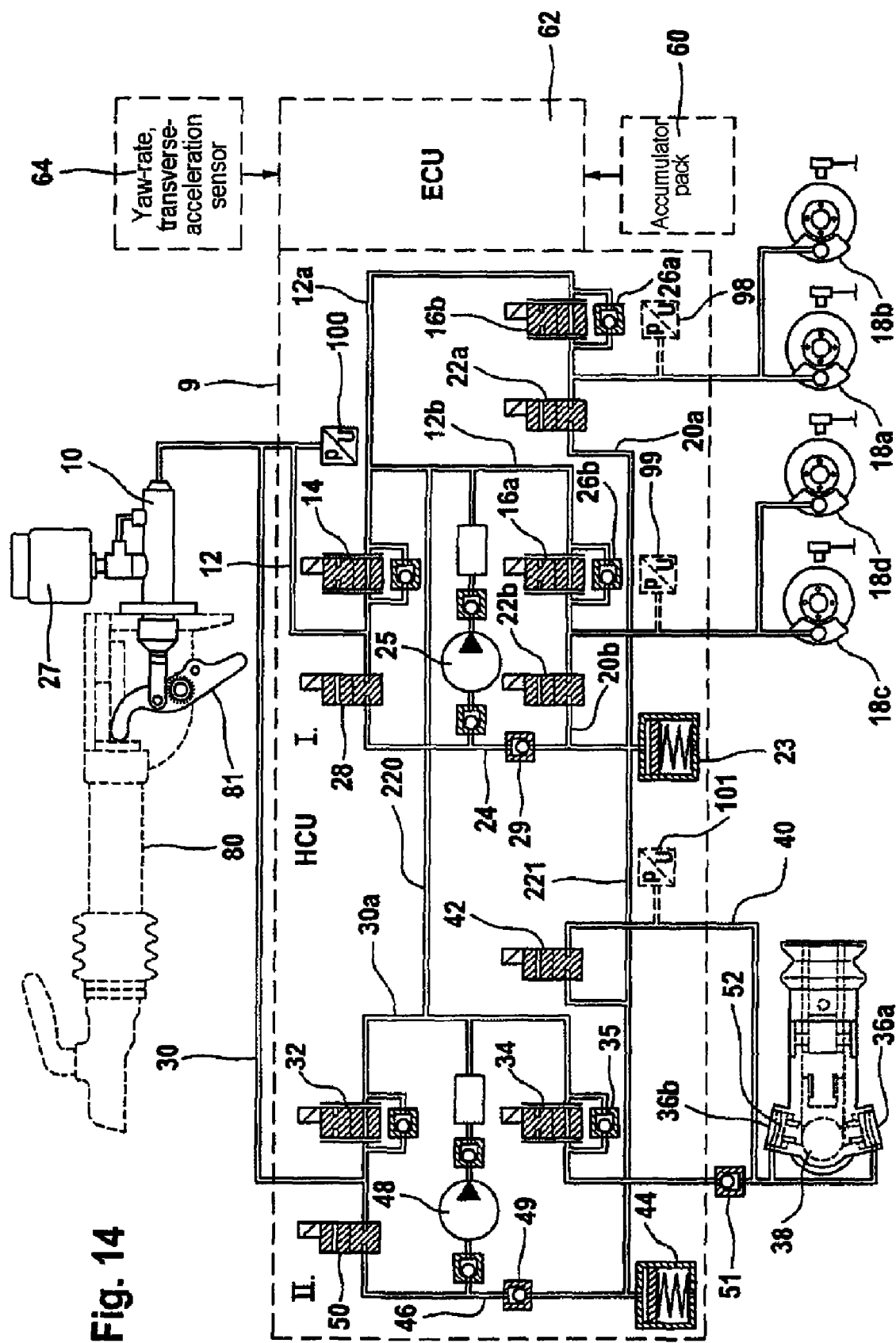
FIG. 14 shows an embodiment of the hydraulic circuit diagram illustrated in FIG. 3, but with "short-circuited" pumps and low-pressure accumulators of the two circuits, and with a special return circuit of the ball-shaped stabilizing coupling with an outlet valve and nonreturn valve.

FIG. 14 shows a further design variant of the "short circuited" hydraulic trailer brake system. The control circuit I corresponds essentially to the design according to FIG. 3. The pressure or force transmission device 9 is designed such that the wheel brakes 18a and 18b and also 18c and 18d are connected correspondingly to the wheel brakes 18c and 18d described in FIG. 1. One brake pressure transmission circuit consists of a brake cylinder 10 of an inertia brake 80, which is actuated by a mechanical unit 81 of the inertia brake 80. On the brake cylinder 10, a reservoir 27 is arranged, which contains a pressure medium and which is connected to the working chamber of the brake cylinder 10 in the brake release position. The brake pressure transmission circuit illustrated has the brake line 12 connected to at least one working chamber of the brake cylinder 10 and having a first isolating valve 14 which in its rest position forms an open passage for the brake line 12. A nonreturn valve 15 is connected in parallel to the isolating valve 14 and opens from the direction of the brake cylinder 10. The isolating valve 14 is actuated electromagnetically in the conventional way. However, variations in which hydraulic actuation takes place may also be envisaged.

The brake line 12 branches into two brake pressure sublines 12a, 12b which lead in each case to two wheel brakes 18a, 18b and 18c, 18d of a trailer axle. The brake pressure sublines contain in each case an electromagnetically actuable inlet valve 16a, 16b which are open in their rest position and can be switched into a blocking position by the actuating magnet being excited. A nonreturn valve 26a, 26b is connected in parallel to each inlet valve 16a, 16b and opens from the direction of the wheel brakes 18a, 18b and 18c, 18d. Connected in parallel to these wheel brake circuits 12, 12a, 12b is the recirculating circuit consisting of return lines 20a, 20b which are connected to the pressure medium pump 25. The wheel brakes 18a and 18b, via the outlet valve 22a, and the wheel brakes 18c and 18d, via the outlet valve 22b, are connected via the return lines 20a, 20b to the line 24 and consequently to the suction side of the pressure medium pump 25, the delivery side of which is connected to the brake pressure sublines 12a, 12b at a point of issue between the isolating valve 14 and the inlet valves 16a, 16b.

The conveying pump 25 is designed as a reciprocating pump with a delivery valve and a suction valve which are not illustrated in any more detail. Located on the suction side of the pressure medium pump 25 is a low-pressure accumulator 23 which is connected to the return lines 20a, 20b.

In the connection between the low-pressure accumulator 23 and the pressure medium pump 25 is inserted a pretensioned nonreturn valve 29 opening to the pump.

Furthermore, the suction side of the pump 25 is connected to the brake cylinder 10 via the additional line 24 having the first changeover valve 28.

The second control circuit II of the pressure or force transmission circuit 9 has a line 30 which is connected to the brake master cylinder and which branches into a pressure subline 30a and a line 46. The pressure subline 30a leads via a second currentlessly open isolating valve 32 and a parallel-connected nonreturn valve 33 to actuators 36a, 36b of the stabilizing coupling 38 of the trailer. The two actuators 36a, 36b can be acted upon via branches of the pressure subline 30a with the pressure generated in the lines 30, 30a. Alternatively, it is also possible to act upon the actuators individually with the hydraulic medium contained in the reservoir 27 in that two identical pressure transmission circuits are provided. Furthermore, the pressure line 30a contains an electromagnetically actuable inlet valve 34 which is open in its rest position and can be switched into a blocking position by the actuating magnet being excited. Connected in parallel to the inlet valve 34 is a nonreturn valve 35 which opens in the direction of the reservoir 27. Connected in parallel to this pressure circuit 30, 30a is the recirculating circuit which consists of return lines 40, 46 with the pressure medium pump 48 arranged in the line 46. The actuators 36a, 36b are connected via a currentlessly closed outlet valve 42 arranged in the line 40 and via the second low-pressure accumulator 44 to the line 46 and consequently to the suction side of the pressure medium pump 48, the delivery side of which is connected to the brake pressure subline 30a at a point of issue between the isolating valve 32 and the inlet valve 34. Furthermore, a nonreturn valve 51 opening in the direction of the stabilizing coupling 38 is provided downstream of the connection point of the return line 40 and upstream of the inlet valve 34 in the pressure subline 30a. As described previously in the design variants of FIGS. 11 to 13, the low-pressure accumulators 23, 44 and the delivery sides of the pumps 25, 48 are connected to one another via the connecting lines 220, 221.

In all the design variants, the stabilizing coupling may have a venting screw.

The design according to aspects of the invention, as shown in FIG. 14, may, of course, be modified to the effect that it can also be used for a trailer with only one axle and consequently two wheel brakes. For this purpose, in contrast to FIG. 14, instead of the pair of wheel brakes 18c, 18d or 18a, 18b, only one wheel brake, for example 18c, 18a, of the one axle is connected to the brake master cylinder 10. Furthermore, a design is possible which does not have the connecting lines 220, 221. In this case, the low-pressure accumulators 23, 44 or the pumps 25, 48 are not short-circuited.

Furthermore, the hydraulic circuit diagram according to FIG. 14 may also, as illustrated, be implemented with two changeover valves 28, 50, but with only one isolating valve 14 (see FIG. 13) or with one changeover valve 50 and one isolating valve 14 (see FIG. 12).

Basically, all the control circuits I, II described can be combined with one another.

Also, according to an advantageous design, instead of or in combination with two wheel brakes, a hydraulic cylinder for a cable brake can be connected, such as is used, for example, in an electronic parking brake. Thus, two wheels can be braked via the wheel brakes, the stabilizing coupling can be activated and a cable brake of the trailer can be actuated.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A hydraulic trailer brake system comprising
a device for braking wheels of a trailer;
a controllable pressure generator for wheel-individual or axle-individual activation of wheel brakes;
a hydraulic brake force transmission device assigned to the device and connected to the wheel brakes via brake lines, the brake force transmission device including a reservoir for a pressure medium and a brake master cylinder;
an electronic control unit or a regulation unit which receives energy via a supply unit,
wherein at least two wheel brakes are connected to the brake master cylinder via a first isolating valve arranged in the brake lines and via a first changeover valve, in that the wheel brakes are assigned at least one first inlet and one first outlet valve,
a first electrically activatable pressure medium pump provided in a bypass line, downstream of the first changeover valve and the first isolating valve,
the suction side of the electrically activatable pressure medium pump connected to the first changeover valve, to at least one first outlet valve and to a first low-pressure accumulator, and
the delivery side of the first electrically activatable pressure medium pump connected to the first isolating valve and to at least one first inlet valve, and
a stabilizing coupling connected via a second pressure medium pump to actuators which can vary a tension force of the stabilizing coupling between the trailer and a traction vehicle when the pressure medium pump conveys pressure medium out of the reservoir and into or out of the actuators.

2. The hydraulic trailer brake system as claimed in claim 1, wherein the master cylinder is connected to a brake line which is connected downstream of the first isolating valve via a brake pressure subline having a first inlet valve to a first wheel brake and via a brake pressure subline having the first inlet valve to a second wheel brake of a first trailer axle, and wherein the brake line is connected downstream of the isolating valve via a brake pressure subline having a first inlet valve to wheel brakes of a second trailer axle.

3. The hydraulic trailer brake system as claimed in claim 2, wherein the wheel brakes are connected to return lines, wherein a first outlet valve is arranged in each of the return lines, the return lines being connected to the first low-pressure accumulator and, via a line, to the suction side of the first pump and to the first changeover valve which is connected to the brake line.

4. The hydraulic trailer brake system as claimed in claim 1, wherein the reservoir is connected to a second pressure line in which a second isolating valve is connected via a pressure subline having a second inlet valve to actuators of the stabilizing coupling, and the actuators are connected to a return line in which a second outlet valve is arranged, the return line being connected to a second low-pressure accumulator and, via a line, to the suction side of the second pump and to a second changeover valve which is connected to the line.

5. The hydraulic trailer brake system as claimed in claim 1, wherein the supply unit contains accumulators which are connected to a battery of the vehicle via a connecting element between the vehicle and trailer, the accumulators being connected to the electronic control unit or the regulation unit.

6. The hydraulic trailer brake system as claimed in claim 1, wherein the master cylinder is connected to a brake line which is connected downstream of the first isolating valve via a brake pressure subline having a first inlet valve to a first wheel brake and via a brake pressure subline having the first inlet valve to a second wheel brake of a first trailer axle, and in that the brake line is connected upstream of the isolating valve via a brake pressure subline having a first inlet valve to the wheel brakes of a second trailer axle.

7. The hydraulic trailer brake system as claimed in claim 1, wherein the master cylinder is connected to a brake line which is connected downstream of the first isolating valve via a brake pressure subline having a first inlet valve to first wheel brakes of a first trailer axle and via a brake pressure subline having the first inlet valve to the second wheel brakes of a second trailer axle.

8. The hydraulic trailer brake system as claimed in claim 7, wherein the wheel brakes are connected to return lines in each of which a first outlet valve is arranged, the return lines being connected to the first low-pressure accumulator and, via a line, to the suction side of the first pump and to the first changeover valve which is connected to the brake line.

9. The hydraulic trailer brake system as claimed in claim 7, wherein the brake line is connected downstream of the first isolating valve via a brake pressure subline having a first outlet valve to a high-pressure accumulator.

10. The hydraulic trailer brake system as claimed in claim 9, wherein a filter is arranged between the isolating valve and the outlet valve in the brake pressure subline.

11. The hydraulic trailer brake system as claimed in claim 7, wherein the reservoir is connected to a second pressure line in which a second isolating valve is connected via a pressure subline and a pressure line having second inlet valves to the actuators of the stabilizing coupling, and the actuators are connected to return lines in which a second outlet valve is arranged, the return lines being connected to the second low-pressure accumulator and, via a line, to a suction side of the second pump and to a second changeover valve which is connected to the line.

12. The hydraulic trailer brake system as claimed in claim 7, wherein the reservoir is connected to a second pressure line in which a second isolating valve is connected via a pressure subline having a second inlet valve to the actuators of the stabilizing coupling and a pressure line having a second inlet valve connected to a high-pressure accumulator, and the actuators are connected to a return line and the high-pressure accumulator is connected to a return line, in which return lines second outlet valves are arranged, the return lines being connected to the second low-pressure accumulator and, via a line, to a suction side of the second pump and to a second changeover valve which is connected to the line.

13. The hydraulic trailer brake system as claimed in 1, wherein the reservoir is connected to a second pressure line in which a second isolating valve is connected via a pressure subline to the actuators of the stabilizing coupling, the pressure line being connected via a line to a suction side of the second pump.

14. The hydraulic trailer brake system as claimed in claim 13, wherein an outlet valve is arranged in the pressure subline.

15. The hydraulic trailer brake system as claimed in claim 13, wherein the brake master cylinder has two pressure chambers with two outlets, the brake line being connected to the outlet and the pressure line to the outlet, and the brake line being connected downstream of the first isolating valve via a brake pressure subline having a first inlet valve to the wheel brakes of a first trailer axle, and wherein the wheel brakes are connected to a return line in which a first outlet valve is arranged, the return line being connected to the first low-pressure accumulator and, via a line, to the suction side of the first pump and to the first changeover valve which is connected to the brake line.

16. The hydraulic trailer brake system as claimed in claim 13, wherein the pressure line is connected via a second isolating valve in a pressure subline having a second inlet valve to the actuators of the stabilizing coupling and via a pressure subline and a second inlet valve to the wheel brakes of a second trailer axle, and the actuators and the wheel brakes are connected in each case to a return line in each of which a second outlet valve is arranged, the return lines being connected in each case to a second low-pressure accumulator and, via a line, to a suction side of the second pump and to a second changeover valve which is connected to the line.

17. The hydraulic trailer brake system as claimed in claim 1, wherein the brake master cylinder is connected to a second pressure line in which a second isolating valve is connected in a pressure subline having a second inlet valve to the actuators of the stabilizing coupling and via a pressure subline and a second inlet valve to the wheel brakes of a second trailer axle, and the actuators and the wheel brakes are connected in each case to a return line in each of which a second outlet valve is arranged, the return lines being connected to a second low-pressure accumulator and, via lines, to a suction side of a second pump and to a second changeover valve which is connected to a second pressure line.

18. The hydraulic trailer brake system as claimed in claim 1, wherein two wheels brakes are connected to the brake master cylinder via a first isolating valve arranged in the brake line and via a first changeover valve, in that the wheel brakes are assigned a first inlet and a first outlet valve, and in that there is provided in a bypass line, downstream of the first changeover valve and of the first isolating valve, the first electrically activatable pressure medium pump, the suction side of which is connected to the first changeover valve, to the first outlet valve and to the first low-pressure accumulator and the delivery side of which is connected to the first isolating valve and to the first inlet valve.

19. The hydraulic trailer brake system as claimed in claim 1, wherein the wheel brakes are connected to the first low-pressure accumulator via the return line having the outlet valve.

20. The hydraulic trailer brake system as claimed in claim 1, wherein the return lines with the first outlet valve and with the second outlet valve are connected to the first low-pressure accumulator and to a second low-pressure accumulator via a connecting line.

21. The hydraulic trailer brake system as claimed in claim 1, wherein the delivery sides of the first pressure medium pump and of a second pressure medium pump are connected to one another via a connecting line.

22. The hydraulic trailer brake system as claimed in claim 21, wherein the connecting line is connected to the brake line between the first isolating valve and the bypass line having the first pressure medium pump and to the pressure subline between the second isolating valve and the bypass line having the second pressure medium pump.

23. The hydraulic trailer brake system as claimed in claim 1, wherein the brake master cylinder is connected to the suction side of a second pressure medium pump by means of a second pressure line via a second changeover valve, in that the delivery side of the pump is connected via the pressure subline having the inlet valve to the actuators of the stabilizing coupling and via a pressure subline and the inlet valve to the wheel brakes of a second trailer axle, and the actuators and the wheel brakes are connected in each case to a return line in each of which a second outlet valve is arranged, the return lines being connected via the connecting line to the first and a second low-pressure accumulator and, via a line, to the suction side of the second pump and to the second changeover valve which is connected to the line.

24. The hydraulic trailer brake system as claimed in claim 23, wherein two wheel brakes are connected to the brake master cylinder via a first isolating valve arranged in the brake line and via a first changeover valve, in that the wheel brakes are assigned a first inlet and a first outlet valve, in that there is provided in a bypass line, downstream of the first changeover valve and of the first isolating valve, the first electrically activatable pressure medium pump, the suction side of which is connected to the first changeover valve, to the first outlet valve and to the first low-pressure accumulator and the delivery side of which is connected to the first isolating valve and to the first inlet valve, and in that the delivery sides of the first pressure medium pump and of the second pressure medium pump are connected to one another via a connecting line.

25. The hydraulic trailer brake system as claimed in claim 1, wherein two wheel brakes are connected to the brake master cylinder via an isolating valve arranged in the brake line and via a changeover valve, in that the wheel brakes are assigned a first inlet and a first outlet valve, in that there is provided in a bypass line, downstream of the changeover valve and of the isolating valve, the first electrically activatable pressure medium pump, the suction side of which is connected to the changeover valve, to the first outlet valve and to the first low-pressure accumulator and the delivery side of which is connected to the first isolating valve and to the first inlet valve, and the first changeover valve is connected via a connecting line to the suction side of the second pressure medium pump, to a second low-pressure accumulator and to a second outlet valve, the second low-pressure accumulator being connected to the first low-pressure accumulator via the connecting line, and a delivery side of the second pressure medium pump being connected via the connecting line to the delivery side of the first pressure medium pump and being connected via the pressure subline and the inlet valve to the actuators of the stabilizing coupling and via a pressure subline having the inlet valve to the wheel brakes of a second trailer axle, the wheel brakes being connected to the connecting line via the return line and the outlet valve.

26. The hydraulic trailer brake system as claimed in claim 1, wherein the master cylinder is connected to a brake line which is connected downstream of the first isolating valve via a brake pressure subline having a first inlet valve to first wheel brakes of a first trailer axle and via a brake pressure subline having the first inlet valve to the second wheel brakes of a second trailer axle, and in that the wheel brakes are connected to return lines in each of which a first outlet valve is arranged, the return lines being connected to the first low-pressure accumulator and, via a line, to the suction side of the first pump and to the first changeover valve which is connected to the brake line.

27. The hydraulic trailer brake system as claimed in claim 26, wherein the brake master cylinder is connected to a second pressure line in which a second isolating valve is connected via a pressure subline having a second inlet valve to the actuators of the stabilizing coupling, and the actuators are connected to a return line in which a second outlet valve is arranged, the return line being connected to a second low-pressure accumulator and, via a line, to a suction side of the second pump and to a second changeover valve which is connected to the line, and the return lines having the first outlet valves being connected via a connecting line to the first low-pressure accumulator and to the second low-pressure accumulator, and the delivery sides of the first pressure medium pump and of the second pressure medium pump being connected to one another via a connecting line.

28. The hydraulic trailer brake system as claimed in claim 26, wherein a nonreturn valve opening to the stabilizing coupling is arranged between the inlet valve and a connection point of the return line having the outlet valve to the pressure subline.

29. The hydraulic trailer brake system as claimed in claim 1, wherein the stabilizing coupling is ball-shaped.

* * * * *